US012732495B2

(12) United States Patent
Terao

(10) Patent No.: US 12,732,495 B2
(45) Date of Patent: Sep. 8, 2026

(54) INFORMATION PROCESSING APPARATUS, METHOD FOR CONTROLLING THE SAME, AND STORAGE MEDIUM

(71) Applicant: CANON KABUSHIKI KAISHA, Tokyo (JP)

(72) Inventor: Yoshihide Terao, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 15 days.

(21) Appl. No.: 18/827,959

(22) Filed: Sep. 9, 2024

(65) Prior Publication Data

US 2025/0097208 A1 Mar. 20, 2025

(30) Foreign Application Priority Data

Sep. 15, 2023 (JP) ................................ 2023-150285

(51) Int. Cl.
*H04L 9/40* (2022.01)

(52) U.S. Cl.
CPC .......... *H04L 63/0807* (2013.01); *H04L 63/10* (2013.01)

(58) Field of Classification Search
CPC ............................ H04L 63/0807; H04L 63/10
See application file for complete search history.

(56) References Cited

U.S. PATENT DOCUMENTS 9,069,981 B2 * 6/2015 O'Sullivan ............. H04L 51/00
9,418,325 B1 * 8/2016 Kitamura ........... G06K 15/4095
10,084,823 B2 * 9/2018 Sondhi .................. H04L 63/102
10,637,805 B2 * 4/2020 Wang ..................... H04L 51/56
10,841,313 B2 * 11/2020 Parthasarathy ..... H04L 63/0884
10,944,746 B1 * 3/2021 Zhuang ............... H04L 63/0876
10,972,585 B2 * 4/2021 Ward ..................... G06Q 10/40
11,811,710 B1 * 11/2023 Toren ...................... H04L 51/21
12,363,107 B2 * 7/2025 Okuyama .............. G06F 21/32
2003/0086124 A1 * 5/2003 Parry ..................... H04N 1/324 358/402
2003/0095281 A1 * 5/2003 Parry .................... G06F 3/1267 358/1.15
2003/0101343 A1 * 5/2003 Eaton ...................... H04L 51/04 713/170
2003/0115462 A1 * 6/2003 Kim ...................... G06F 21/608 713/170
2004/0122730 A1 * 6/2004 Tucciarone ......... H04L 12/1859 705/14.66
2004/0249934 A1 * 12/2004 Anderson .............. H04L 51/06 709/224
2005/0108530 A1 * 5/2005 Tonegawa .............. H04L 63/08 713/170
2006/0265596 A1 * 11/2006 Nagayama .......... H04L 63/0853 713/182
2007/0016644 A1 * 1/2007 Corona ................. H04L 51/214 709/206

(Continued)

FOREIGN PATENT DOCUMENTS

JP 2020204795 A 12/2020

*Primary Examiner* — David Garcia Cervetti
(74) *Attorney, Agent, or Firm* — Venable LLP

(57) ABSTRACT

An information processing apparatus provides a setting screen for performing authorizing for an email service, makes a request to the email service using an access token obtained as a result of the authorizing. The information processing apparatus provides settings setting screens for performing different types of authorizing are provided for a first email service and a second email service.

11 Claims, 16 Drawing Sheets

(56) References Cited

U.S. PATENT DOCUMENTS

2007/0156827 A1* 7/2007 Lu .......................... H04L 51/04 709/206
2008/0126493 A1* 5/2008 Morrey ................ G06Q 10/107 709/206
2012/0050823 A1* 3/2012 Khawaja ............ H04N 1/00225 358/474
2012/0057182 A1* 3/2012 Watanabe .......... H04N 1/32379 358/1.16
2013/0086645 A1* 4/2013 Srinivasan ............ H04L 9/3234 726/4
2013/0232239 A1* 9/2013 Akiyama ............ H04L 41/0889 709/220
2013/0332546 A1* 12/2013 Miyazawa .............. H04L 51/48 709/206
2013/0335771 A1* 12/2013 Sugiura .............. H04N 1/00233 358/1.14
2014/0022592 A1* 1/2014 Ueda ..................... G06F 3/1219 358/1.15
2014/0099922 A1* 4/2014 Cazanas ................ H04L 67/564 455/411
2014/0123236 A1* 5/2014 Hirata ................. H04L 63/0807 726/4
2014/0181934 A1* 6/2014 Mayblum ............. H04L 67/306 726/7
2014/0211233 A1* 7/2014 Biswal .................. G06F 3/1238 358/1.14
2014/0230020 A1* 8/2014 Mogaki ................. H04L 9/3213 726/4
2015/0101032 A1* 4/2015 Shimakawa ............ G06F 21/62 726/8
2015/0193600 A1* 7/2015 Matsuda ............. H04L 63/0823 726/9
2016/0127577 A1* 5/2016 Okamoto ........... H04N 1/00212 358/1.14
2016/0323227 A1* 11/2016 Avdienkov .............. H04L 63/08
2017/0099148 A1* 4/2017 Ochmanski ........... H04L 67/125
2017/0264611 A1* 9/2017 Alen ................... H04L 63/0884
2018/0026959 A1* 1/2018 Votaw ................... H04L 63/083 726/7
2018/0026960 A1* 1/2018 Votaw ................... H04L 63/083 726/9
2018/0219847 A1* 8/2018 Kim ........................ H04L 63/08
2018/0295124 A1* 10/2018 Li ....................... H04L 63/0815
2019/0104185 A1* 4/2019 Sillitoe ............... H04L 41/0883
2019/0245854 A1* 8/2019 Saito ....................... G06F 21/31
2019/0364159 A1* 11/2019 Saeda .................... H04N 1/346
2020/0193422 A1* 6/2020 Goenka ............ G06Q 10/06311
2020/0412886 A1* 12/2020 Saito ....................... H04L 51/08
2021/0216251 A1* 7/2021 Suzuki .................... H04L 12/28
2021/0224009 A1* 7/2021 Kikuchi ................ G06F 3/1293
2021/0350883 A1* 11/2021 Li .......................... G16H 50/20
2022/0070177 A1* 3/2022 Valeski ................... H04L 63/08
2022/0292584 A1* 9/2022 Kumar ................. H04L 9/3213
2022/0417378 A1* 12/2022 Nagao ................ H04N 1/00854
2023/0093470 A1* 3/2023 Dvornik ................ H04L 67/306 726/7
2023/0120471 A1* 4/2023 Vembu .................... H04L 67/10 709/206
2023/0208986 A1* 6/2023 Hatada ............... H04N 1/00244 358/1.15
2023/0291744 A1* 9/2023 Gaffney ................ H04L 63/105
2023/0308592 A1* 9/2023 Sasaki ................ H04N 1/00209
2023/0370552 A1* 11/2023 Bhaskaran ......... H04N 1/00225
2023/0388311 A1* 11/2023 Kishimoto ............ H04L 63/102
2024/0171562 A1* 5/2024 Mori ..................... H04L 9/3213
2024/0177200 A1* 5/2024 Lu ......................... H04L 51/046
2024/0372845 A1* 11/2024 Tokunaga ............. H04L 63/108
2025/0015996 A1* 1/2025 Watanabe ............. H04L 9/3213
2025/0062903 A1* 2/2025 Khare ................... H04L 9/3247

* cited by examiner

110
AUTHORIZATION SERVER A
120
MAIL SERVER A
AUTHORIZATION SERVER B
130
131
· EMAIL APPLICATION 2
CLIENT ID:XXXX
CLIENT SECRET:YYYY
140
MAIL SERVER B
160
NETWORK
150
CLIENT TERMINAL
WEB BROWSER
151
100
MFP
102
OPERATION UNIT
105
MFP USER DB
101
CONTROLLER UNIT
106
IMAGE STORAGE
103
PRINTER UNIT
104
SCANNER UNIT

FIG. 2

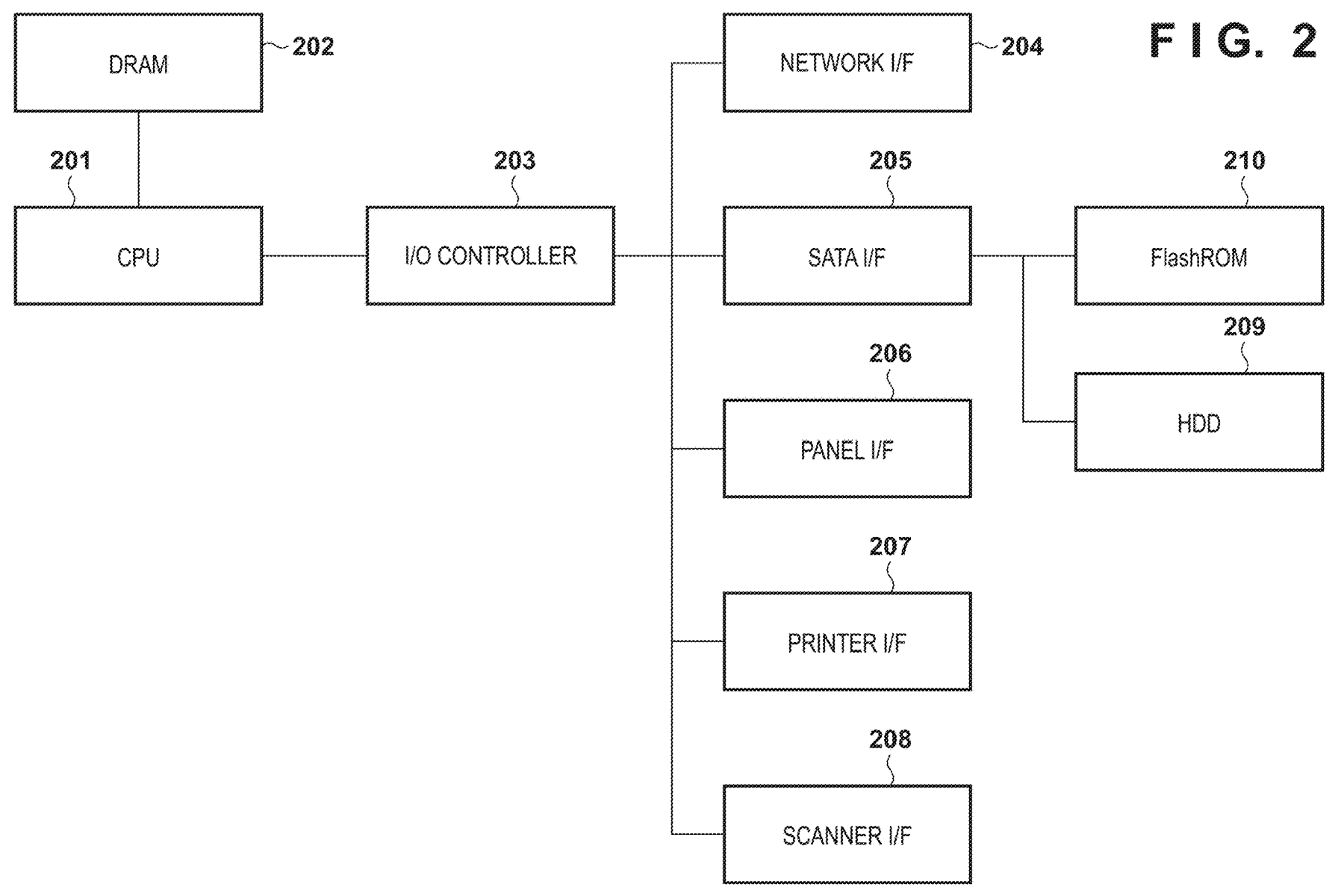

210 FlashROM
209 HDD
204 NETWORK I/F
205 SATA I/F
206 PANEL I/F
207 PRINTER I/F
208 SCANNER I/F
203 I/O CONTROLLER
202 DRAM
201 CPU 150
CLIENT TERMINAL
DRAM
402
401
403
404
CPU
I/O CONTROLLER
NETWORK I/F
405
406
SATA I/F
FlashROM
407
410
PANEL I/F
HDD

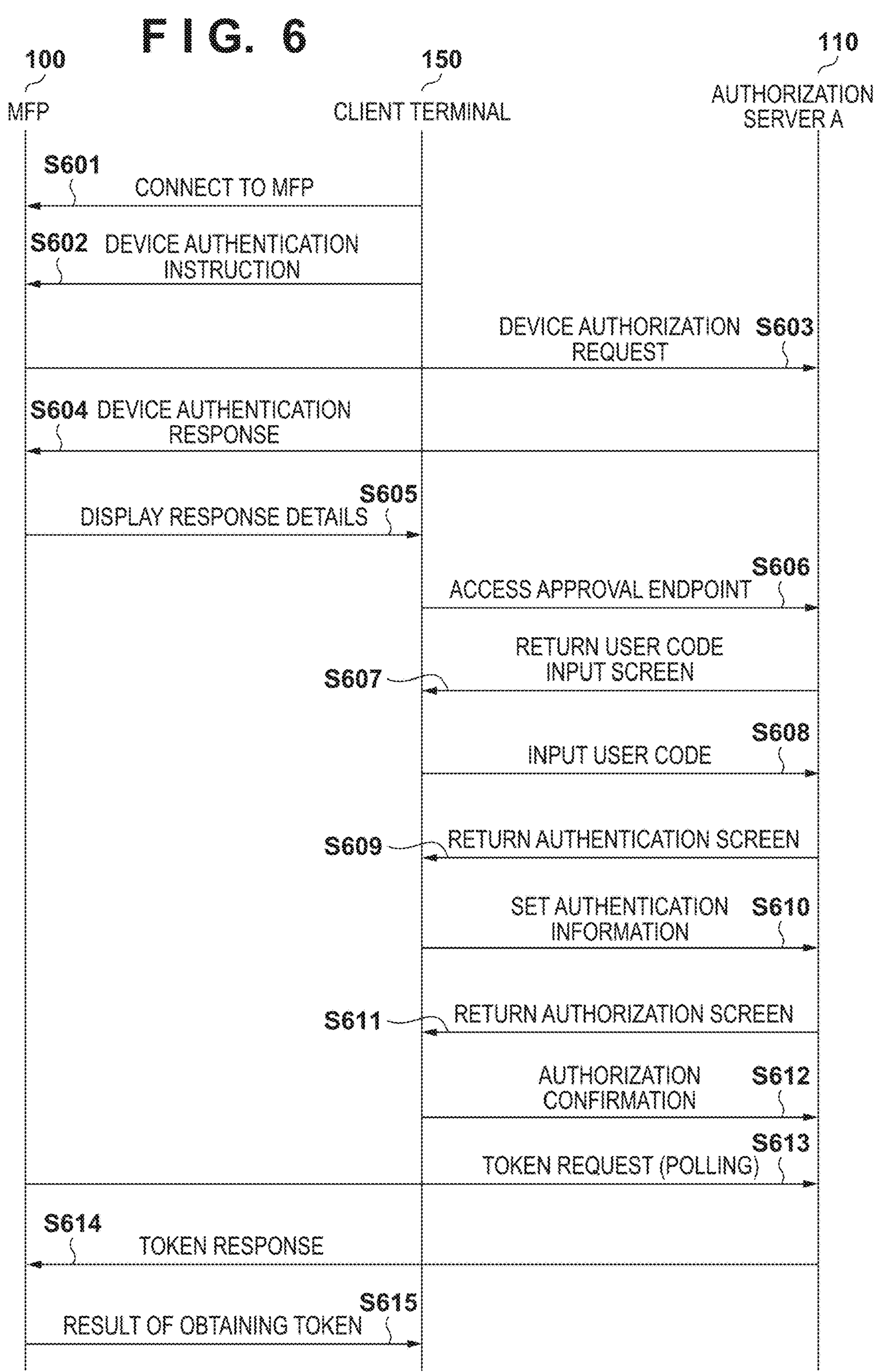
FIG. 6
100
MFP
150
CLIENT TERMINAL
110
AUTHORIZATION SERVER A
S601
CONNECT TO MFP
S602
DEVICE AUTHENTICATION INSTRUCTION
DEVICE AUTHORIZATION REQUEST
S603
S604
DEVICE AUTHENTICATION RESPONSE
S605
DISPLAY RESPONSE DETAILS
S606
ACCESS APPROVAL ENDPOINT
RETURN USER CODE INPUT SCREEN
S607
S608
INPUT USER CODE
S609
RETURN AUTHENTICATION SCREEN
SET AUTHENTICATION INFORMATION
S610
S611
RETURN AUTHORIZATION SCREEN
AUTHORIZATION CONFIRMATION
S612
S613
TOKEN REQUEST (POLLING)
S614
TOKEN RESPONSE
S615
RESULT OF OBTAINING TOKEN

FIG. 9A

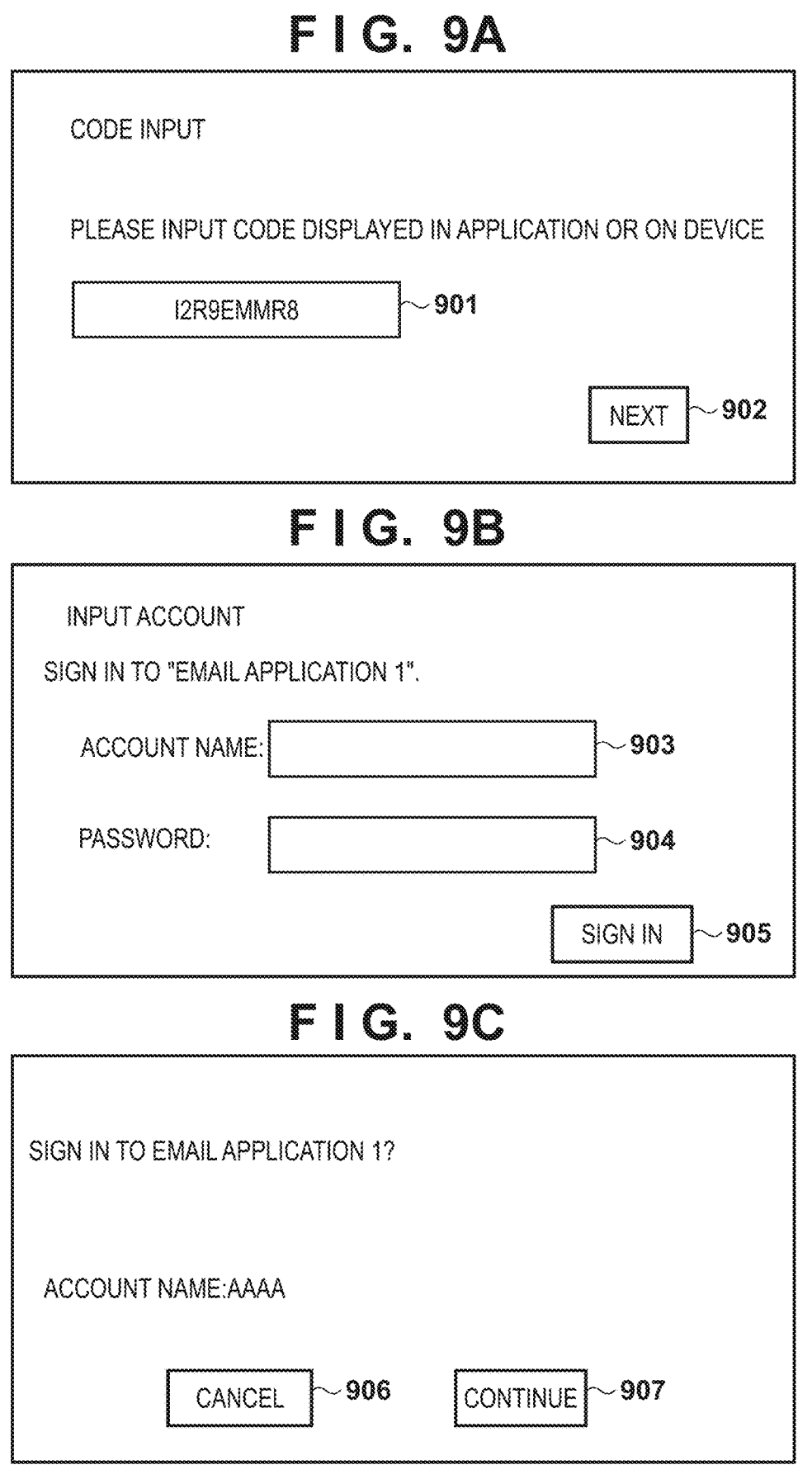

CODE INPUT

PLEASE INPUT CODE DISPLAYED IN APPLICATION OR ON DEVICE

I2R9EMMR8 901

NEXT 902

FIG. 9B

INPUT ACCOUNT

SIGN IN TO "EMAIL APPLICATION 1".

ACCOUNT NAME: 903

PASSWORD: 904

SIGN IN 905

FIG. 9C

SIGN IN TO EMAIL APPLICATION 1?

ACCOUNT NAME:AAAA

CANCEL 906

CONTINUE 907

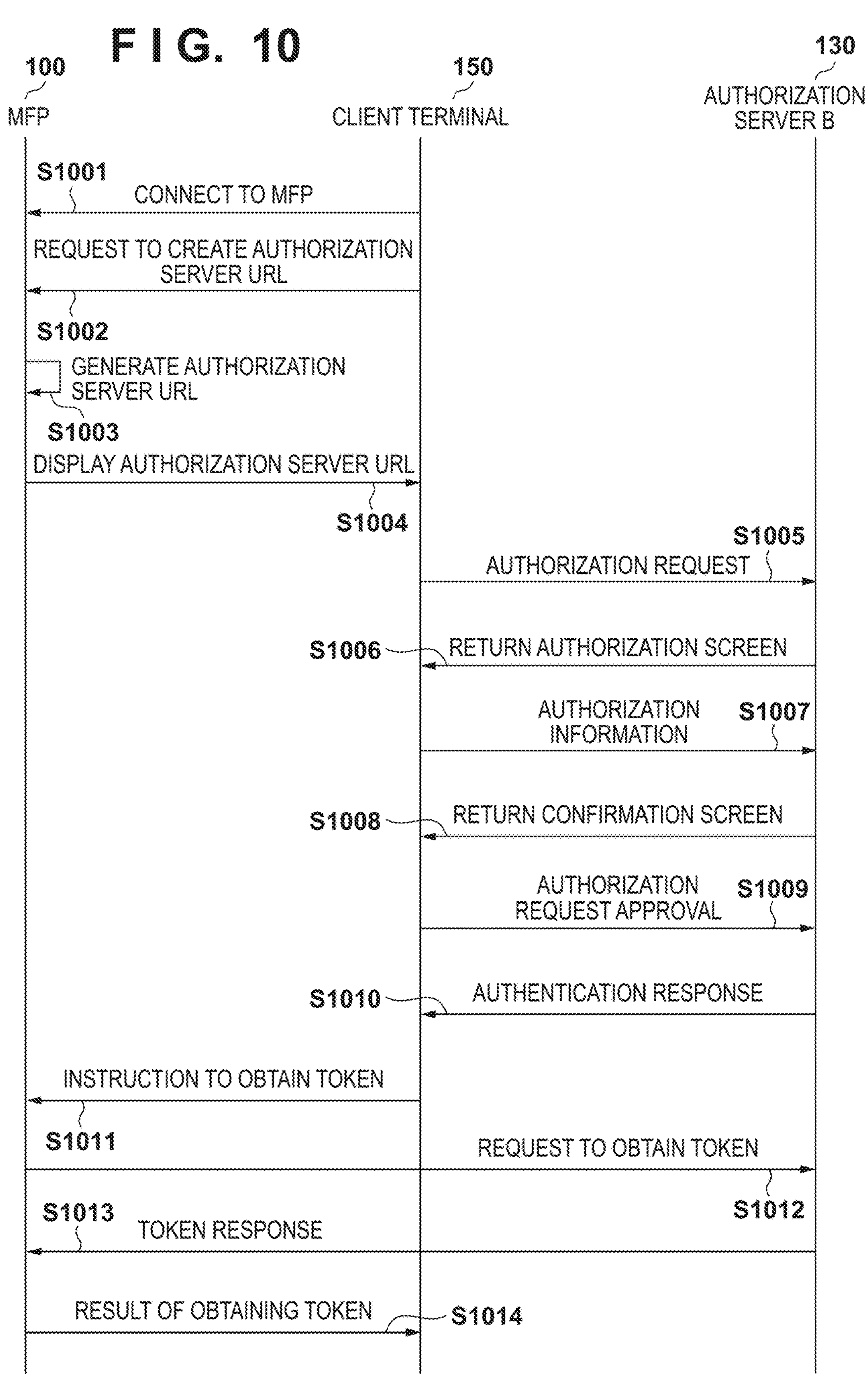
F I G. 10
100
MFP
150
CLIENT TERMINAL
130
AUTHORIZATION SERVER B
S1001
CONNECT TO MFP
REQUEST TO CREATE AUTHORIZATION SERVER URL
S1002
GENERATE AUTHORIZATION SERVER URL
S1003
DISPLAY AUTHORIZATION SERVER URL
S1004
S1005
AUTHORIZATION REQUEST
S1006
RETURN AUTHORIZATION SCREEN
AUTHORIZATION INFORMATION
S1007
S1008
RETURN CONFIRMATION SCREEN
AUTHORIZATION REQUEST APPROVAL
S1009
S1010
AUTHENTICATION RESPONSE
INSTRUCTION TO OBTAIN TOKEN
S1011
REQUEST TO OBTAIN TOKEN
S1012
S1013
TOKEN RESPONSE
RESULT OF OBTAINING TOKEN
S1014

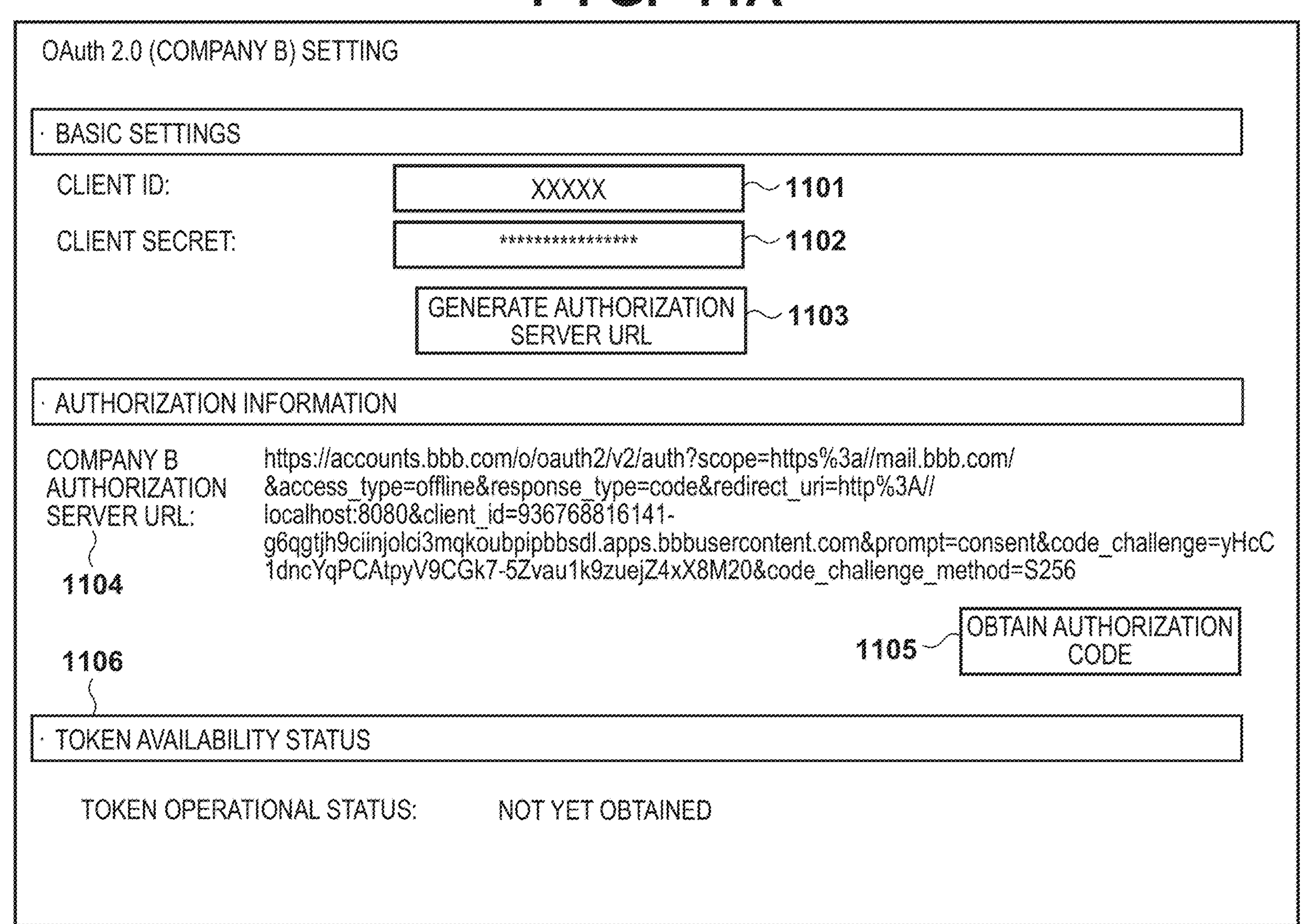
FIG. 11A
OAuth 2.0 (COMPANY B) SETTING
· BASIC SETTINGS
CLIENT ID:
XXXXX
1101
CLIENT SECRET:
****************
1102
GENERATE AUTHORIZATION SERVER URL
1103
· AUTHORIZATION INFORMATION
COMPANY B AUTHORIZATION SERVER URL:
1104
https://accounts.bbb.com/o/oauth2/v2/auth?scope=https%3a//mail.bbb.com/
&access_type=offline&response_type=code&redirect_uri=http%3A//
localhost:8080&client_id=936768816141-
g6qgtjh9ciinjolci3mqkoubpipbbsdl.apps.bbbusercontent.com&prompt=consent&code_challenge=yHcC
1dncYqPCAtpyV9CGk7-5Zvau1k9zuejZ4xX8M20&code_challenge_method=S256
1105
OBTAIN AUTHORIZATION CODE
1106
· TOKEN AVAILABILITY STATUS
TOKEN OPERATIONAL STATUS:
NOT YET OBTAINED

F I G. 11B

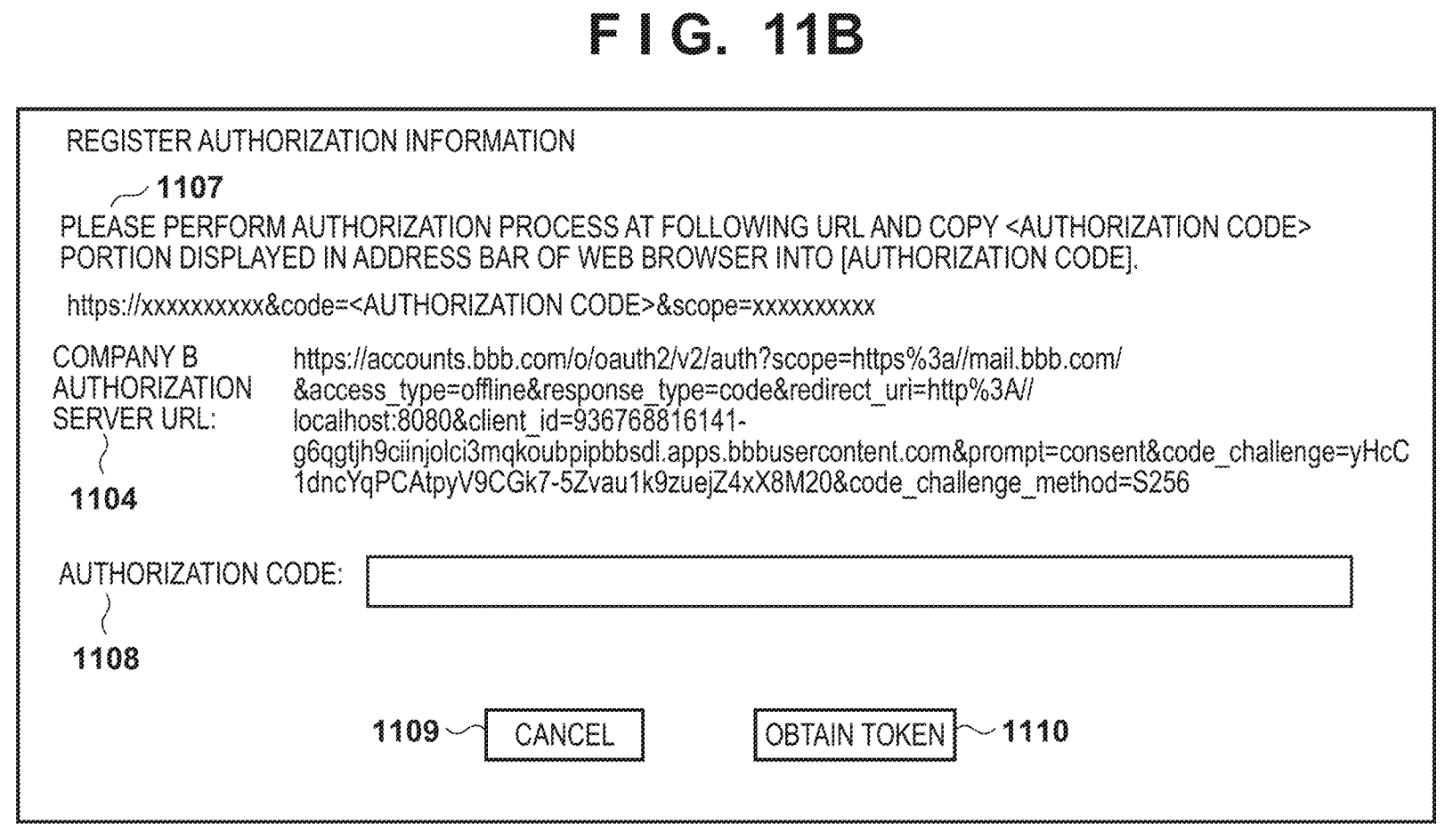

REGISTER AUTHORIZATION INFORMATION

1107

PLEASE PERFORM AUTHORIZATION PROCESS AT FOLLOWING URL AND COPY <AUTHORIZATION CODE> PORTION DISPLAYED IN ADDRESS BAR OF WEB BROWSER INTO [AUTHORIZATION CODE].

https://xxxxxxxxxx&code=<AUTHORIZATION CODE>&scope=xxxxxxxxxx

COMPANY B AUTHORIZATION SERVER URL:

https://accounts.bbb.com/o/oauth2/v2/auth?scope=https%3a//mail.bbb.com/&access_type=offline&response_type=code&redirect_uri=http%3A//localhost:8080&client_id=936768816141-g6qgtjh9ciinjolci3mqkoubpipbbsdl.apps.bbbusercontent.com&prompt=consent&code_challenge=yHcC1dncYqPCAtpyV9CGk7-5Zvau1k9zuejZ4xX8M20&code_challenge_method=S256

1104

AUTHORIZATION CODE:

1108

1109 CANCEL

OBTAIN TOKEN 1110

FIG. 12A

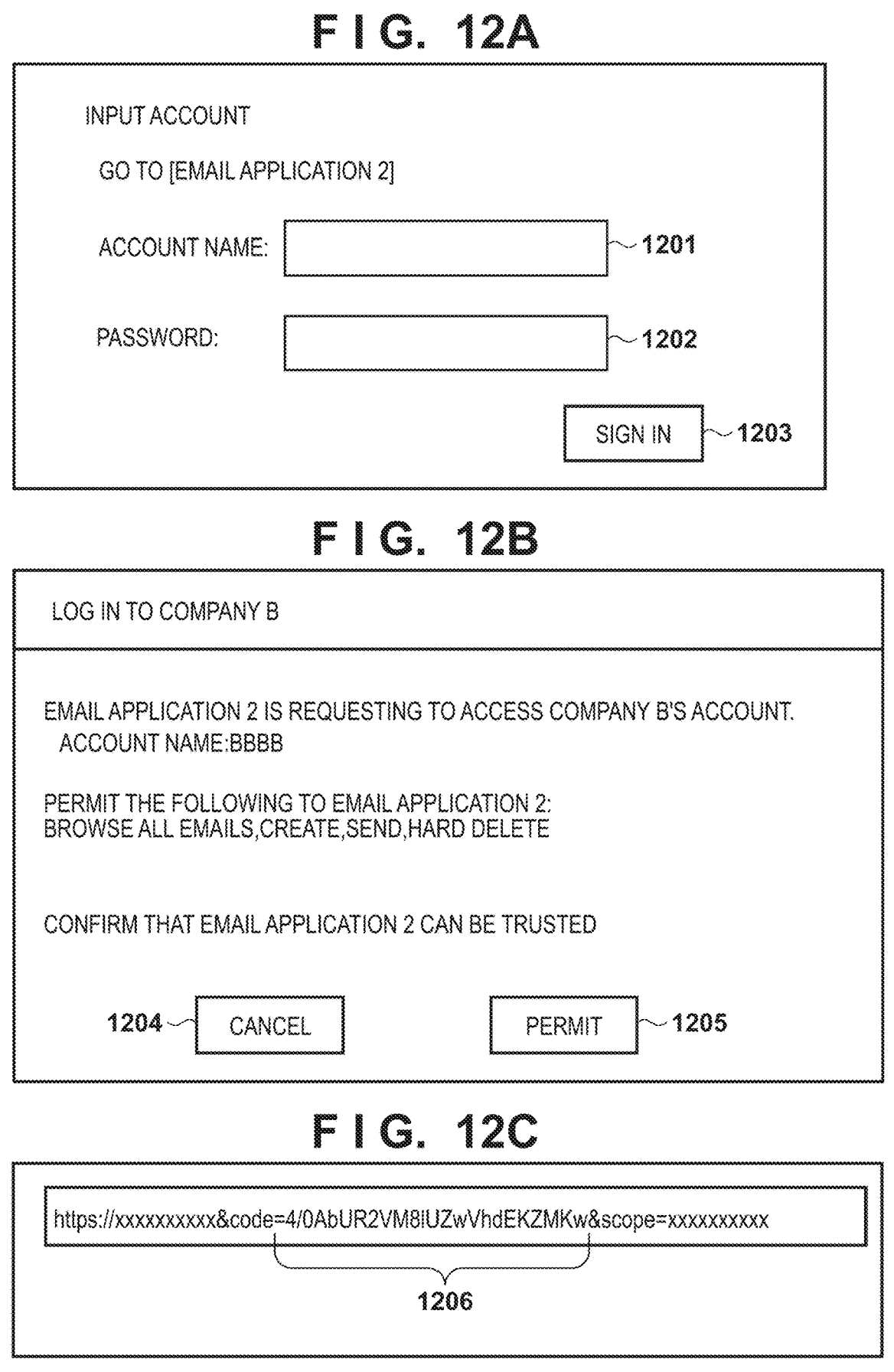

INPUT ACCOUNT

GO TO [EMAIL APPLICATION 2]

ACCOUNT NAME: 1201

PASSWORD: 1202

SIGN IN 1203

FIG. 12B

LOG IN TO COMPANY B

EMAIL APPLICATION 2 IS REQUESTING TO ACCESS COMPANY B'S ACCOUNT.
ACCOUNT NAME:BBBB

PERMIT THE FOLLOWING TO EMAIL APPLICATION 2:
BROWSE ALL EMAILS,CREATE,SEND,HARD DELETE

CONFIRM THAT EMAIL APPLICATION 2 CAN BE TRUSTED

1204 CANCEL PERMIT 1205

FIG. 12C https://xxxxxxxxxx&code=4/0AbUR2VM8lUZwVhdEKZMKw&scope=xxxxxxxxxx

1206

F I G. 13A
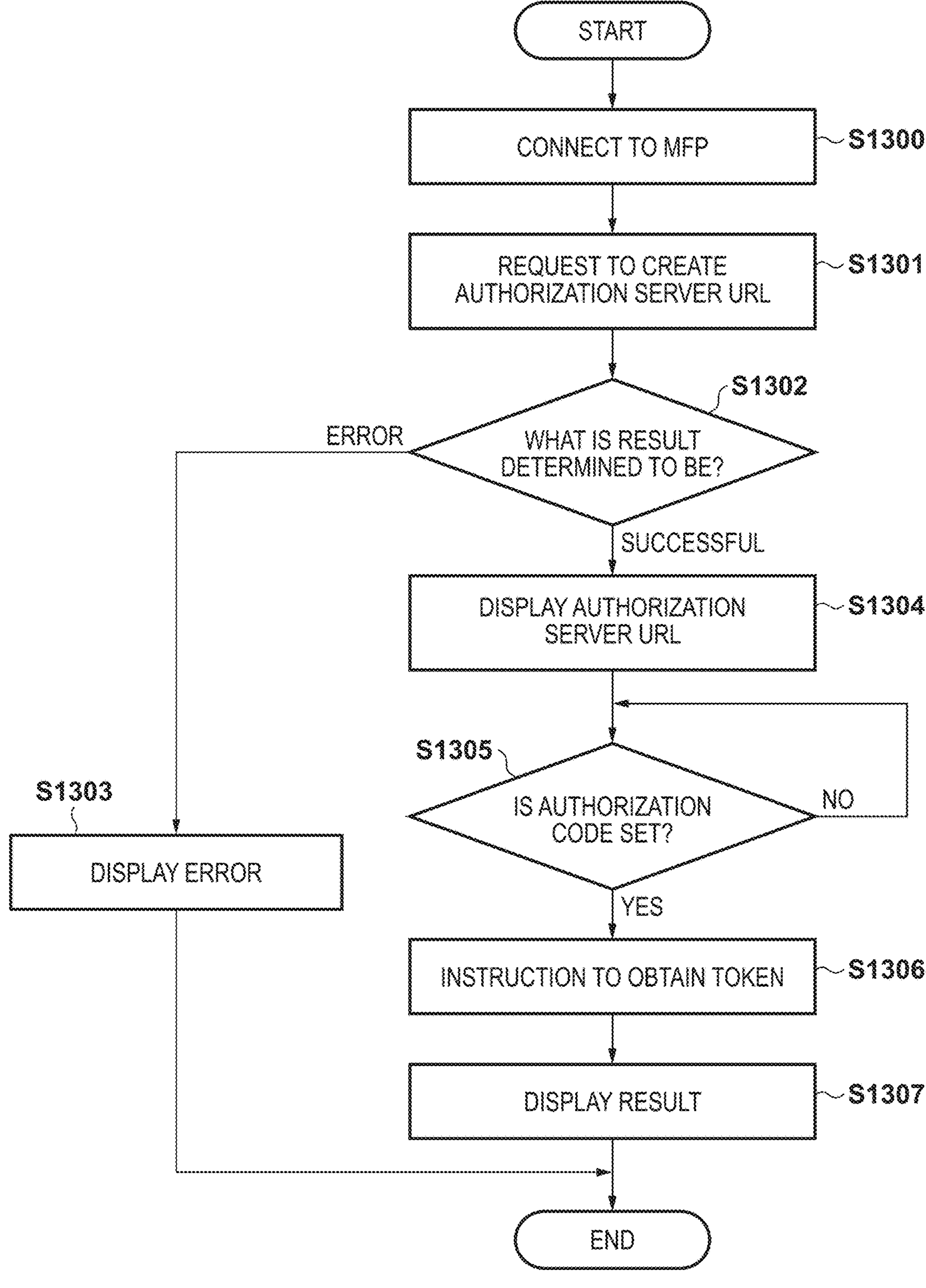

INFORMATION PROCESSING APPARATUS, METHOD FOR CONTROLLING THE SAME, AND STORAGE MEDIUM

BACKGROUND OF THE INVENTION

Field of the Invention

The present invention relates to an information processing apparatus, method for controlling the same and a storage medium.

Description of the Related Art

In recent years, a variety of cloud-based services has been provided. OAuth 2.0 is commonly known as an authorization protocol for granting an application on a client terminal a secure access right to resources when accessing a cloud service server from the application.

The client terminal obtains an access token needed to access the cloud service from a server called an authorization server. This can strengthen authentication when accessing the cloud service and reduce the threat of impersonation and fraudulent access.

In OAuth 2.0, a plurality of methods are defined in RFC 6749 for the authorization flow to obtain the access token, and the available method differs between authorization servers and between cloud services.

RFC 8628, which was published in August 2019, also defines a mechanism for devices without a browser or with limited text input, such as smart TVs, to obtain the access token from the authorization server.

RFC specifies the following authorization flows to obtain the access token:

authorization code flow (RFC 6749 Chapter 4.1);
implicit flow (RFC 6749 Chapter 4.2);
resource owner password credentials flow (RFC 6749 Chapter 4.3);
client credentials flow (RFC 6749 Chapter 4.4); and
device flow (RFC 8628).

In the following description, the authorization code flow (RFC 6749 Chapter 4.1) is referred to simply as the authorization code flow, and the device flow (RFC 8628) is referred to simply as the device flow.

Recently, more and more devices other than PCs, such as MFPs, are connecting to cloud services, and there is an increasing need to support OAuth 2.0. Japanese Patent Laid-Open No. 2020-204795 proposes an MFP capable of using a plurality of cloud storages by obtaining an access token needed for access from an authorization server. The specific method is as follows. A QR code (registered trademark) containing an address of an endpoint for OAuth authorization and a destination to which the result is notified is displayed in a web browser installed in the main body of the MFP, and a mobile terminal reads this QR code. The mobile terminal performs authorization with respect to an authorization server using a user ID and a password, and transmits an authorization code given from the authorization server to the MFP.

As for the method proposed in Japanese Patent Laid-Open No. 2020-204795, services that support the authorization code flow cannot be used with products in which a web browser cannot be installed for reasons such as low hardware performance of the main body of the MFP due to the inability to display a QR code on such products. Meanwhile, authorization by means of the device flow does not require a web browser on the main body of the MFP, but services that support the authorization code flow cannot be used either in the MFP without a web browser.

SUMMARY OF THE INVENTION

The present invention enables realization of a setting screen that makes it possible to use email services of different types of authorization flows in an image forming apparatus.

One aspect of the present invention provides an information processing apparatus comprising: one or more memory devices that store a set of instructions; and one or more processors that execute the set of instructions to: provide a first setting screen for performing authorizing settings of a first authorizing type for a first email service; and make a request to the first email service using an access token obtained as a result of the authorizing settings of the first authorizing type; provide a second setting screen for performing authorizing settings of a second authorizing type, different from the first authorizing type, for a second email service, and make a request to the second email service using an access token obtained as a result of the authorizing settings of the second authorizing type.

Another aspect of the present invention provides a method for controlling an information processing apparatus, the method comprising: providing a first setting screen for performing authorizing settings of a first authorizing type for a first email service; making a request to the first email service using an access token obtained as a result of the authorizing settings of the first authorizing type; providing a second setting screen for performing authorizing settings of a second authorizing type, different from the first authorizing type, for a second email service, and making a request to the second email service using an access token obtained as a result of the authorizing settings of the second authorizing type.

Still another aspect of the present invention provides a non-transitory computer readable storage medium on which is stored a computer program for causing a computer to execute a method for controlling an information processing apparatus, the method comprising: providing a first setting screen for performing authorizing settings of a first authorizing type for a first email service; making a request to the first email service using an access token obtained as a result of the authorizing settings of the first authorizing type; providing a second setting screen for performing authorizing settings of a second authorizing type, different from the first authorizing type, for a second email service, and making a request to the second email service using an access token obtained as a result of the authorizing settings of the second authorizing type.

Further features of the present invention will be apparent from the following description of exemplary embodiments with reference to the attached drawings.

BRIEF DESCRIPTION OF THE DRAWINGS

FIG. 2 shows a configuration of a controller unit of an MFP.

FIG. 6 is a sequence diagram of the device flow.

FIGS. 9A to 9C show examples of setting screens in the device flow.

FIG. 10 is a sequence diagram of the authorization code flow.

FIGS. 11A and 11B show examples of setting screens in the authorization code flow.

FIGS. 12A to 12C show examples of setting screens in the authorization code flow.

FIG. 13A is a flowchart of the authorization code flow.

DESCRIPTION OF THE EMBODIMENTS

Figure 1:
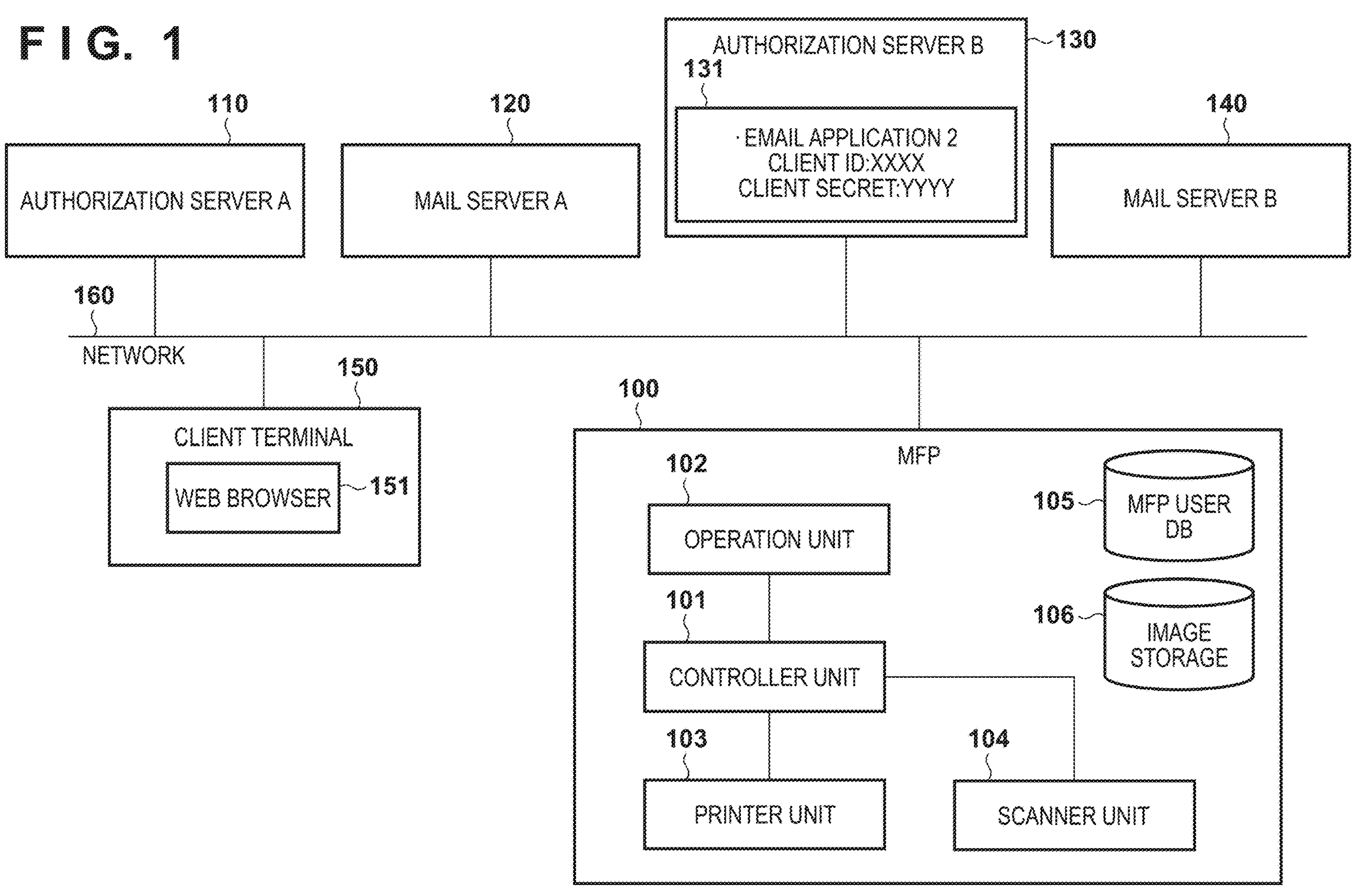
FIG. 1 shows a system configuration according to the present invention.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

First Embodiment

An embodiment of the present invention is described below with reference to the drawings.

In the present embodiment, an example is described in which an image forming apparatus, a client terminal such as a PC or a smartphone, and an authorization server cooperate to provide email services.

First, an example of a configuration of an image forming system according to the present embodiment is described with reference to FIG. 1. The image forming system includes an MFP 100, a plurality of authorization servers A 110 and B 130, a plurality of email servers A 120 and B 140, and a client terminal 150.

In the present embodiment, an email service provided by the email server A 120 of a company A is authorized by an authorization server A 110 that supports the device flow as the authorization flow. An email service provided by the email server B 140 of a company B is authorized by an authorization server B 130 that supports the authorization code flow as the authorization flow.

The MFP 100, the authorization servers A 110 and B 130, the email servers A 120 and B 140, and the client terminal 150 are connected via a network 160. The network 160 may use either wired connections or wireless connections, and may be either the Internet or an intranet. For example, the network 160 may be of any mode, such as wireless, Wi-Fi, or a data communication line, as long as data can be exchanged. The MFP 100, the authorization servers A 110 and B 130, the email servers A 120 and B 140, and the client terminal 150 need not employ the same network type. For example, a mode is possible in which the MFP 100, the authorization servers A 110 and B 130, and the email servers A 120 and B 140 are wired to the Internet, and the client terminal 150 is connected via a data communication line.

The MFP 100 is an image forming apparatus, and includes a controller unit 101, an operation unit 102, a printer unit 103, a scanner unit 104, an MFP user database (DB) 105, and an image storage 106.

The operation unit 102 performs input/output processing with respect to a user, includes a display and an operation panel, and obtains an event corresponding to a user operation.

The printer unit 103 receives a control command and image data to be printed, and forms an image on a sheet based on the image data. The printing method may be an electrophotographic method or an inkjet method. In the case of the electrophotographic method, an electrostatic latent image is formed on a photosensitive member and then developed using toner. The toner image is transferred to a sheet, and the transferred toner image is fixed to form an image. In the case of the ink jet method, an image is formed on a sheet by ejecting ink. The scanner unit 104 scans an image on a sheet and generates image data. The image data generated by the scanner unit 104 is stored in the image storage 106. The image forming apparatus 100 can also form an image on a sheet using the printer unit 103 by copying, i.e., using the image data generated by the scanner unit 104. The scanner unit 104 has an original document feeder (not shown) and can scan sheets placed in the original document feeder while conveying the sheets one by one.

The operation unit 102, the printer unit 103, and the scanner unit 104 are connected to the controller unit 101 and realize functions of the image forming apparatus under the control of the controller unit 101.

Information regarding MFP users for performing authentication when using the MFP 100 is stored in the MFP user DB 105. The image storage 106 has a temporary area in which temporary image data such as data used in the printer unit 103 and data converted by the scanner unit 104 are stored, and a long-term storage area in which image data that needs to be stored for a longer time period is stored.

The authorization server A 110 operates as an authorization server defined by OAuth 2.0 (RFC 8628). The authorization server A 110 accepts an OAuth 2.0 authorization request by means of the device flow for connecting to the email server A 120 from the MFP 100. If the authorization is successful, the authorization server A 110 returns an access token for accessing the email server A 120 to the requesting MFP 100.

The authorization server B 130 operates as an authorization server defined by OAuth 2.0 (RFC 6749). An application (e.g., email application 2) permitting access by means of the authorized code flow is registered in advance with the authorized server B 130, and information 131 including a client ID and a client secret is issued in advance. The issued client ID and client secret are pre-set in the MFP 100 that requests the authorization code flow.

The authorization server B 130 accepts an OAuth 2.0 authorization request by means of the authorization code flow for connecting to the email server B 140 from the client terminal 150 or the MFP 100. If the OAuth 2.0 authorization is successful, the authorization server B 130 returns an access token for accessing the email server B 140 to the requesting MFP 100.

Next, the controller unit 101 of the MFP is described in detail with reference to FIG. 2. A CPU 201 performs the primary computational processing in the controller. The CPU 201 is connected to a DRAM 202 via a bus. The DRAM 202 is used by the CPU 201 as a working memory for temporarily arranging program data representing operation instructions and data to be processed in the process of computation performed by the CPU 201. The CPU 201 is connected to an I/O controller 203 via a bus. The I/O controller 203 performs input and output to and from various devices in accordance with instructions from the CPU 201. The I/O controller 203 is connected to a serial advanced technology attachment (SATA) I/F 205, and a FlashROM 210 and an HDD 209 are connected to the SATA I/F 205.

The CPU 201 uses the FlashROM 210 and the HDD 209 to permanently store programs for realizing the functions of the MFP, and document files. A network I/F 204 is connected to the I/O controller 203. Wired LAN devices and wireless LAN devices are connected to the network I/F 204. The CPU 201 controls the wired LAN devices and the wireless LAN devices via the network I/F 204, thereby realizing communication on the network 160. A panel I/F 206 is connected to the I/O controller 203, and the CPU 201 realizes input and output for a user to and from the operation unit 102 via the panel I/F 206. A printer I/F 207 is connected to the I/O controller 203, and the CPU 201 realizes output to a paper medium using the printer unit 103 via the printer I/F 207.

The MFP 100 has various applications for using the functions of the MFP. Examples include a copy function and a transmission function.

For example, when the copy function is implemented, the CPU 201 loads program data from the FlashROM 210 into the DRAM 202 via the SATA I/F 205. The CPU 201 detects a copy instruction from the user that is given to the operation unit 102 via the panel I/F 206 in accordance with the program loaded into the DRAM 202. Upon detecting a copy instruction, the CPU 201 receives a scanned original document as image data from the scanner unit 104 via the scanner I/F 208, and stores the received image data in the DRAM 202. The CPU 201 performs color conversion suitable for output on the image data stored in the DRAM 202. The CPU 201 transfers the image data stored in the DRAM 202 to the printer unit 103 via the printer I/F 207, and outputs the image data to a paper medium.

When the transmission function is implemented, the CPU 201 performs processing to detect a transmission instruction from the user in the same manner as in the aforementioned copy function. The transmission instruction from the user includes a transmission protocol, a specified destination, an image format, and the like. The transmission protocol is SMB, FTP, or the like, and the destination is specified by, for example, the universal naming convention (UNC). The image format is JPEG, PDF, or the like.

Upon detecting a transmission instruction from the user, the CPU 201 receives a scanned original document as image data from the scanner unit 104 via the scanner I/F 208, and stores the read image data in the DRAM 202. The CPU 201 converts the format of the image data stored in the DRAM 202 into an image format specified by the user, for example. The CPU 201 transmits the image data stored in the DRAM 202 to the destination specified by the user via the network I/F 204 in accordance with the transmission protocol specified by the user. The details of email transmission will be described later.

Note that examples of the functions of the MFP 100 have been described above, but the MFP 100 may also have other functions.

Figure 3:
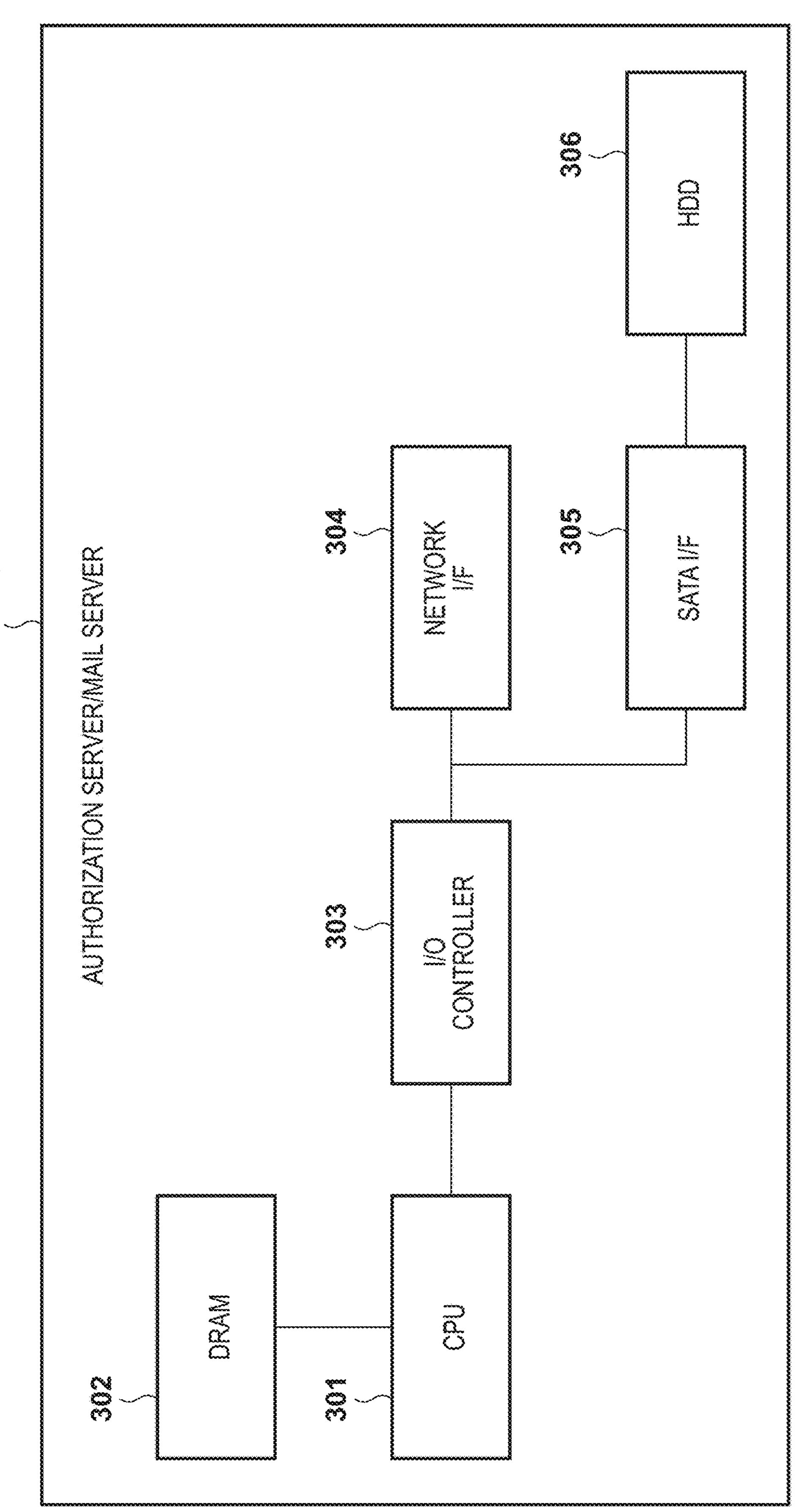
FIG. 3 shows a configuration of a controller unit of an authorization server/email server.

Next, an example of a configuration of the authorization servers A 110 and B 130 and the email servers A 120 and B 140 according to the present embodiment is described with reference to FIG. 3. FIG. 3 shows a configuration of a general server. In the present embodiment, the authorization servers A 110 and B 130 and the email servers A 120 and B 140 are described with reference to the same block diagram for simplicity, but they may have different configurations.

The authorization servers A 110 and B 130 and the email servers A 120 and B 140 each include a CPU 301, a DRAM 302, an I/O controller 303, a network I/F 304, a SATA I/F 305, and an HDD 306.

The CPU 301 controls overall operation of the server. The CPU 301 is connected to the DRAM 302 via a bus. The DRAM 302 is used by the CPU 301 as a working memory for temporarily arranging program data representing operation instructions and data to be processed in the process of computation performed by the CPU 301.

The CPU 301 is connected to an I/O controller 303 via a bus. A network I/F 304 is connected to the I/O controller 303. Wired LAN devices and wireless LAN devices are connected to the network I/F 304. The CPU 301 controls the wired LAN devices and the wireless LAN devices via the network I/F 304, thereby realizing communication on the network 160.

The I/O controller 303 performs input and output to and from various devices in accordance with instructions from the CPU 301. The SATA I/F 305 is connected to the I/O controller 303, and the HDD 306 is connected to the SATA I/F 305.

The CPU 301 executes a program related to authorizing if the server is an authorization server, or executes a program related to email transmission and reception if the server is an email server. Hardware devices such as the CPU 301, the DRAM 302, and the HDD 306 thus constitute a server computer. In the present embodiment, an example case where one CPU 301 performs processing illustrated by each of the later-described flowcharts using one memory (DRAM 302) is described. However, any other mode may be employed. For example, the processing shown in each of the later-described flowcharts can also be performed by cooperation between a plurality of processors, RAMs, ROMs, and storages. Each type of processing can also be performed using a plurality of server computers.

Figure 4:
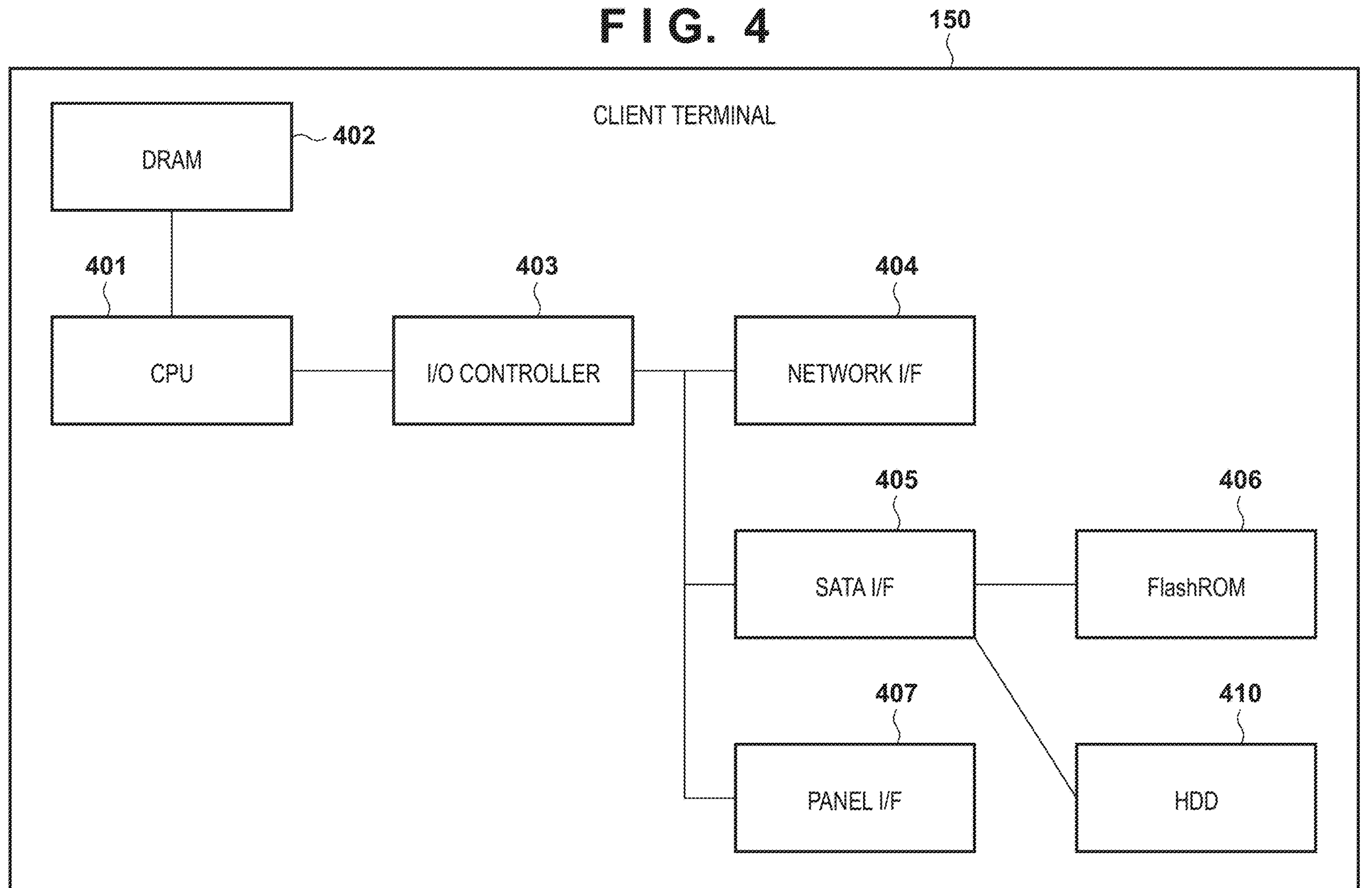
FIG. 4 shows a configuration of a controller unit of a client terminal.

Next, the client terminal 150 according to the present embodiment is described with reference to FIG. 4. The client terminal 150 includes a CPU 401, a DRAM 402, an I/O controller 403, a network I/F 404, a SATA I/F 405, a FlashROM 406, a panel I/F 407, and an HDD 410.

The CPU 401 controls overall operation of the client terminal 150. The CPU 401 is connected to the DRAM 402 via a bus. The DRAM 402 is used by the CPU 401 as a working memory for temporarily arranging program data representing an operation instruction and data to be processed in the process of the computation by the CPU 401.

The CPU 401 is connected to the I/O controller 403 via a bus. The network I/F 404 is connected to the I/O controller 403. Wired LAN devices and wireless LAN devices are connected to the network I/F 404. The CPU 401 controls the wired LAN devices and the wireless LAN devices via the network I/F 404, thereby realizing communication on the network 160.

The I/O controller 403 performs input and output to and from various devices in accordance with instructions from the CPU 401. The SATA I/F 405 is connected to the I/O controller 403, and the FlashROM 406 and the HDD 410 are connected to the SATA I/F 405. The CPU 401 loads a program such as a web browser 151 stored in the HDD 410 into the DRAM 402 and executes the loaded program.

Figure 5:
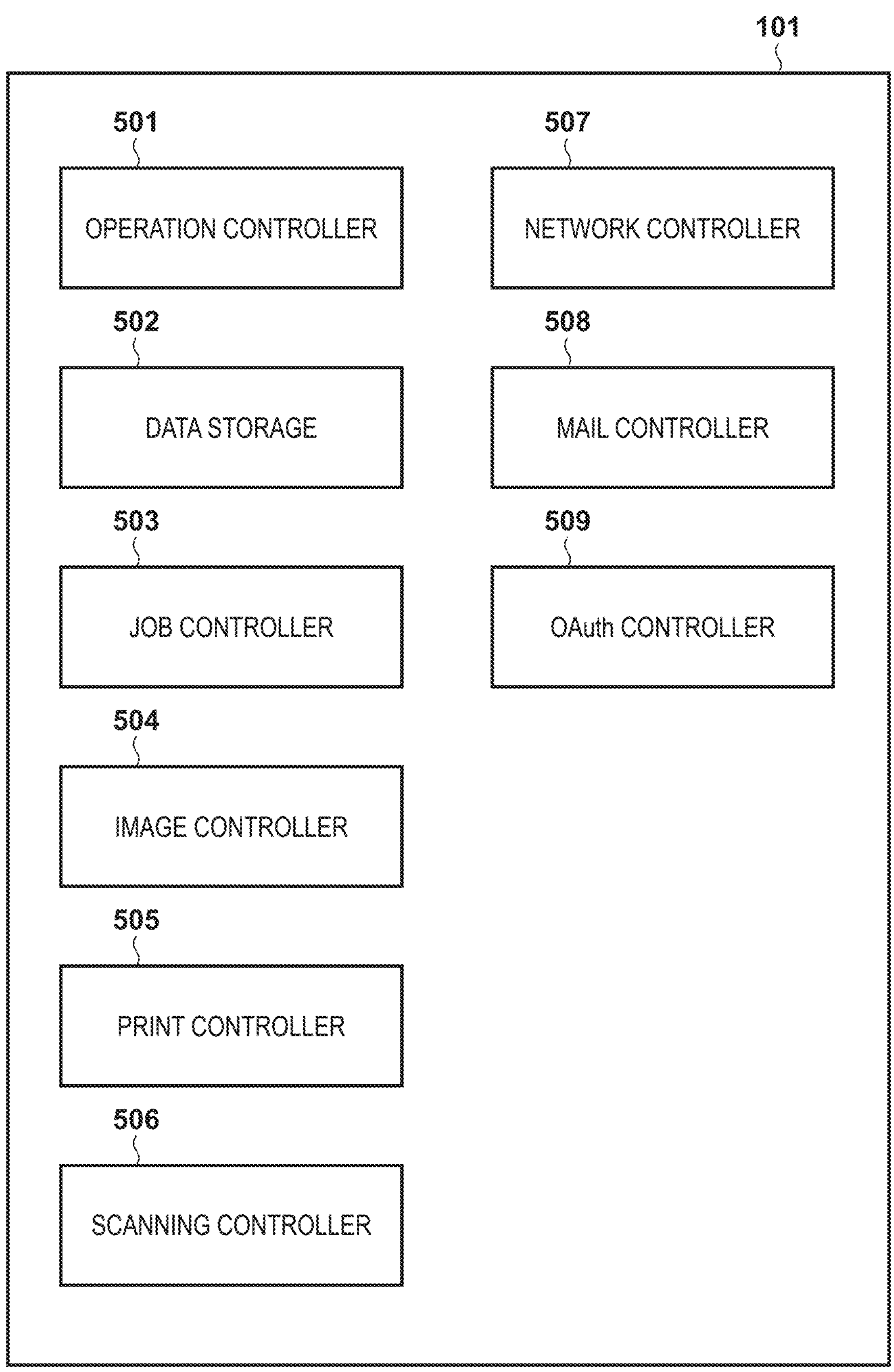
FIG. 5 is a block diagram of software executed in the controller unit of the MFP.

Next, software executed by the controller unit 101 of the MFP 100 is described with reference to FIG. 5. All functions executed by the controller unit 101 of the MFP 100 are realized by the CPU 201 of the MFP 100 loading programs stored in the FlashROM 210 to the DRAM 202 and executing the loaded programs. The functions realized by the software of the MFP 100 include an operation controller 501, a data storage 502, a job controller 503, an image controller 504, a print controller 505, a scanning controller 506, a network controller 507, an email controller 508, and an OAuth controller 509.

The operation controller 501 displays a screen image for the user on the operation unit 102, detects a user operation, and performs processing associated with a screen component such as a button displayed on the screen.

The data storage 502 loads a program stored in the HDD 209 or the FlashROM 210 and stores data in response to a request from another controller.

The job controller 503 controls execution of a job in accordance with an instruction from another controller.

The image controller 504 processes image data into a format suitable for the application in accordance with an instruction from the job controller 503.

The print controller 505 prints an image on a paper medium and outputs the printed image via the printer I/F 207 in accordance with an instruction from the job controller 503.

The scanning controller 506 reads an original document set in the scanner unit via the scanner I/F 208 in accordance with an instruction from the job controller 503.

The network controller 507 inputs and outputs data over a LAN or a public network via the network I/F 204 in accordance with an instruction from any of the controllers. The data stored in the FlashROM 210 by the data storage 502 can be accessed from an external device via the network controller 507. Examples of data stored in the FlashROM 210 include PDF and JPEG images.

The email controller 508 performs processing to transmit, by email, image data read by the scanning controller 506 to an email server (120 or 140) via the network controller 507. The email transmission is performed by transmitting the read image data attached to an email to the email server (120 or 140) using the specified email service.

The OAuth controller 509 is called by the email controller 508 when transmitting an email, and makes an OAuth 2.0 authorization request to the authorization server A 110 or B 130 via the network controller 507. The authorization flow is switched in accordance with the authorization server A 110 or B 130 to be connected. The OAuth controller 509 executes the device flow to obtain an access token when connecting to the authorization server A 110, or executes the authorization code flow to obtain an access token when connecting to the authorization server B 130, and returns the obtained access token to the email controller 508. The email controller 508 transmits or receives an email to and from the email server A 120 or B 140 using the obtained access token.

Operations in the present embodiment are described below.

In the present embodiment, the email service provided by the email server A 120 of the company A is to be authorized by the authorization server A 110 that supports the device flow as the authorization flow. Meanwhile, the email service provided by the email server B 140 of the company B is authorized by the authorization server B 130 that supports the authorization code flow as the authorization flow.

First, a case of using the email service of the company A is described with reference to FIGS. 6, 7, 8, and 9A to 9C.

FIG. 6 shows a sequence for the MFP 100 and the client terminal 150 to execute the OAuth 2.0 authorization flow with respect to the authorization server A 110. The authorization flow shown in FIG. 6 uses the device flow out of the flows listed in the background art section.

Hereinafter, each step number in the processing included in the sequence diagrams and flowcharts is denoted by a number following the letter S. The same applies to the sequence diagrams and flowcharts that will be referenced later.

Processing performed by the MFP 100 in FIG. 6 is realized by the CPU 201 loading a program stored in the FlashROM 210 to the DRAM 202 and executing the loaded program. Processing performed by the MFP 100 in FIG. 6 is performed by the OAuth controller 509.

Processing performed by the authorization server A 110 in FIG. 6 is realized by the CPU 301 loading a program stored in the HDD 306 to the DRAM 302 and executing the loaded program.

Processing performed by the client terminal 150 in FIG. 6 is realized by the CPU 401 reading out a program stored in the FlashROM 406 to the DRAM 402 and executing the loaded program.

The flow starts upon the client terminal 150 starting settings related to email transmission of the MFP 100.

In step S601, the client terminal 150 connects to the MFP 100 from the web browser 151 via the network I/F 404. After the connection has been established, a setting screen related to email transmission of the MFP 100 is displayed in the web browser 151. The setting screen may be displayed in the web browser 151 of the client terminal 150 by being transmitted from the MFP 100 to the client terminal 150, or may be displayed by the web browser 151 of the client terminal 150 reading out the setting screen. The readout may be performed by operating an update button in the web browser 151, or the updating may be automatically performed at a predetermined time interval. The present invention is not limited thereto, and the MFP 100 may cause the client terminal 150 to display the setting screen in any manner.

Figure 7:
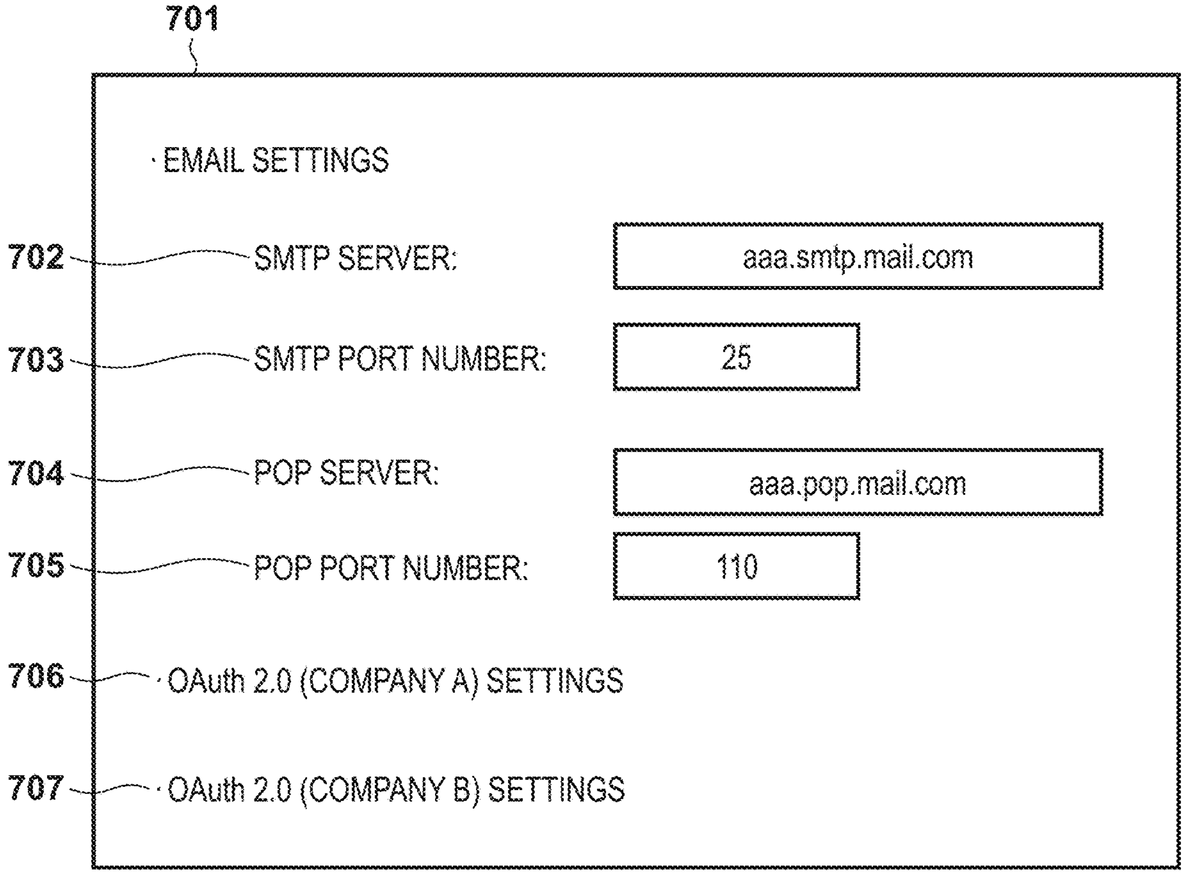
FIG. 7 shows an example of a main transmission setting screen.
Figure 8:
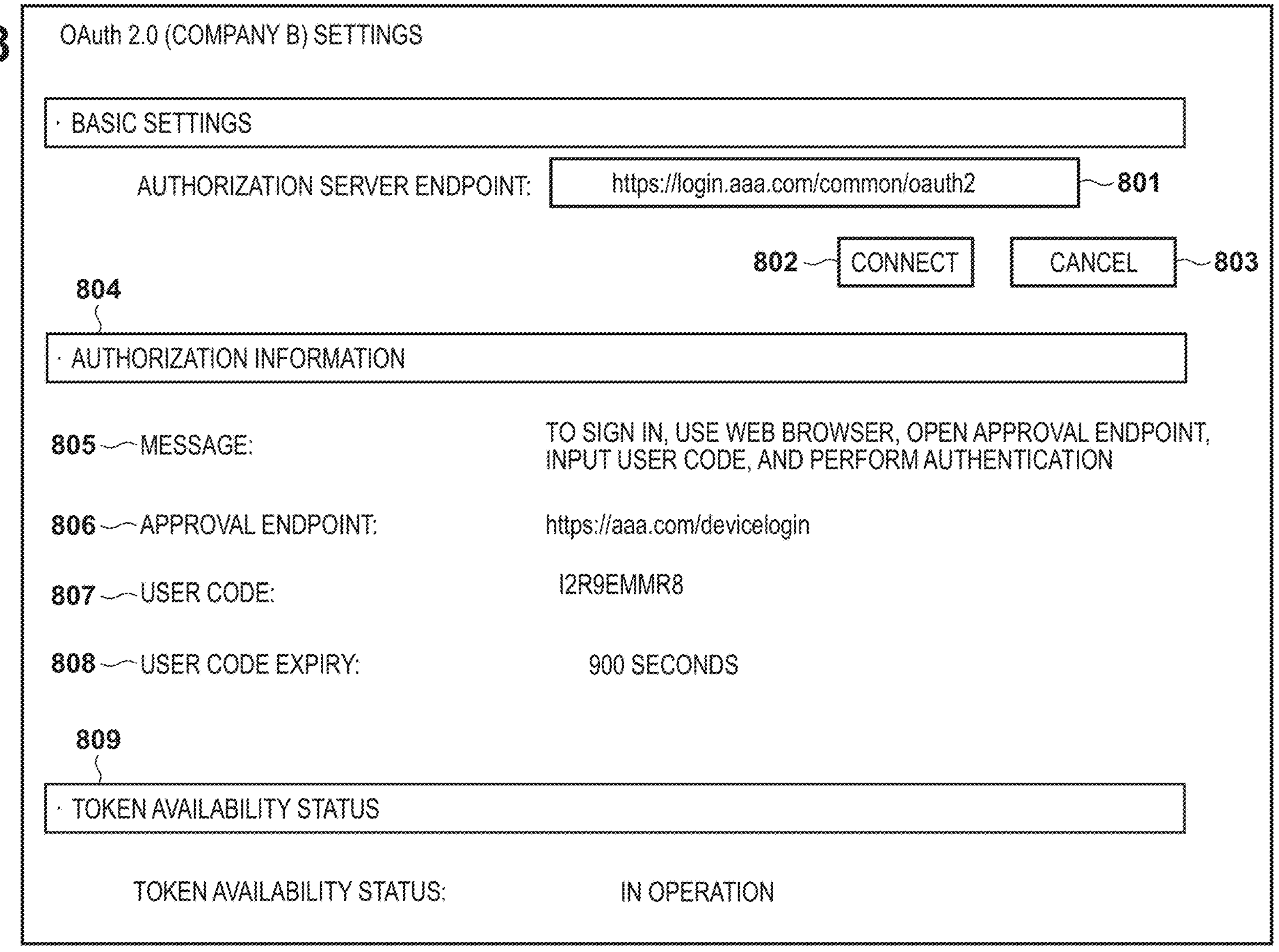
FIG. 8 shows an example of a setting screen in the device flow.

FIG. 7 shows an example of the setting screen related to email transmission. Set values are stored in the HDD 209. When an item "email settings" 701 is selected, various setting fields (SMTP server setting field 702, SMTP port number setting field 703, POP server setting field 704, and POP port number setting field 705) necessary for email transmission and reception are displayed. Any value can be set in each setting field. When an item "OAuth 2.0 (company A) settings" 706 is selected on the screen shown in FIG. 7, a screen related to OAuth 2.0 (company A) shown in FIG. 8 is displayed. Meanwhile, when an item "OAuth 2.0 (company B) settings" 707 is selected, screens related to OAuth 2.0 (company B) shown in FIGS. 11A and 11B are displayed. The setting screens shown in FIGS. 8, 11A and 11B may be displayed in the web browser 151 of the client terminal 150 by being transmitted from the MFP 100 to the client terminal 150. Alternatively, the setting screens shown in FIGS. 8, 11A and 11B may be displayed by the web browser 151 of the client terminal 150 reading out those setting screens. The present invention is not limited thereto, and the screens shown in FIGS. 8, 11A and 11B may be displayed on the client terminal 150 from the MFP 100 in any manner.

FIG. 8 shows an example of a setting screen for executing the device flow as the authorization flow, and FIGS. 11A and 11B show examples of setting screens for executing the authorization code flow as the authorization flow. The settings of the authorization code flow when OAuth 2.0 (company B) is selected will be described later.

To set an endpoint, an endpoint URL predetermined for the authorization server A 110 is set in a box of an endpoint 801 of the authorization server in the OAuth 2.0 (company A) setting screen shown in FIG. 8. Then, the set endpoint URL is stored in the HDD 209 of the MFP 100 via the network I/F 404. The endpoint URL may be set by operating a setting button provided. FIG. 8 omits the setting button.

In step S602, when a connection button 802 is selected, a device authorization instruction is given from the client terminal 150 to the MFP 100 via the network I/F 404. The device authorization instruction may be an instruction to start authorizing of the MFP 100. When a cancel button 803 is selected, the settings are cancelled.

When the MFP 100 receives the device authorization instruction via the network I/F 204, in step S603, the OAuth controller 509 of the MFP 100 obtains the endpoint 801 of the authorization server stored in the HDD 209. The OAuth controller 509 of the MFP 100 connects to the endpoint of the authorization server A 110 via the network I/F 204, thereby requesting the authorization server A 110 to authorize the device.

In step S604, the authorization server A 110 returns authorization information for device authorization to the MFP 100 via the network I/F 304.

In step S605, the MFP 100 returns the received authorization information to the client terminal 150 via the network I/F 204.

The client terminal 150 displays, in the web browser 151, the authorization information received via the network I/F 404 in a field for information for authorization 804 shown in FIG. 8. The field for the information for authorization 804 may be displayed by updating the setting screen provided by the MFP 100 with the information for authorization 804 and reading out the updated setting screen with the web browser 151 of the client terminal 150. The readout may be performed by operating an update button in the web browser 151, or the updating may be automatically performed at a predetermined time interval. The present invention is not limited thereto, and the MFP 100 may cause the client terminal 150 to display the authorization information in the setting screen in any manner.

805 to 808 in FIG. 8 denote examples of information included in the information for authorization 804. A field for a message 805 states a description of processing performed with the information for authorization 804. An access token can be obtained if a URL stated in a field for an approval endpoint 806 is accessed and authentication is successful with information indicated in a field for a user code field 807. The user code has an expiry for security. In the example in FIG. 8, an expiry 808 of the user code is set to 900 seconds.

In step S606, the user accesses the URL (http://aaa.com/devicelogin) in the field for the approval endpoint 806 in FIG. 8 using the web browser 151 of the client terminal 150. The approval endpoint indicated by 806 may be accessed by displaying the URL in the field for the approval endpoint 806 shown in FIG. 8 as a link and enabling the user to access the approval endpoint by operating the link.

When the authorization server A 110 receives the access to the approval endpoint via the network I/F 304, in step S607, the authorization server A 110 returns a user code input screen to the client terminal 150 via the network I/F 304.

The web browser 151 of the client terminal 150 displays the user code input screen received from the authorization server A 110 via the network I/F 404. FIG. 9A shows an example of the user code input screen. The screens shown in FIGS. 9A to 9C in the present embodiment are displayed in windows different from the window shown in FIG. 8, but the present invention is not limited thereto.

In step S608, the user inputs a user code to an input box 901 in FIG. 9A in the web browser 151 of the client terminal 150. The user code is input by copying and pasting "12R9EMMR8" displayed in the user code field 807 in FIG. 8. When the user operates a next button 902, the user code is transmitted to the authorization server A 110 via the network I/F 404. In the present embodiment, the user code is input by being copied and pasted by the user, but this input is not limited to manual input by the user, and may alternatively be performed automatically.

In step S609, if the user code received from the client terminal 150 via the network I/F 304 is correct, the authorization server A 110 returns an authentication screen to the client terminal 150 via the network I/F 304.

The web browser 151 of the client terminal 150 displays the authentication screen received from the authorization server A 110 via the network I/F 404. FIG. 9B shows an example of the authentication screen.

In step S610, the user inputs an account name and a password of the accessing user into an input box for an account name 903 and an input box fora password 904 shown in FIG. 9B in the client terminal 150, and operates a sign-in button 905. The client terminal 150 thus transmits authentication information to the authorization server A 110 via the network I/F 404.

In step S611, if the authentication information received from the client terminal 150 via the network I/F 304 is correct, the authorization server A 110 returns an authorization screen to the client terminal 150 via the network I/F 304.

The web browser 151 of the client terminal 150 displays the authorization screen received from the authorization server A 110 via the network I/F 404. FIG. 9C shows an example of the authorization screen.

In step S612, when the user operates a continue button 907 for authorization in the authorization screen shown in FIG. 9C, authorizing is performed with respect to the authorization server A 110 via the network I/F 404. On the other hand, when the user operates a cancel button 906, authorizing cancelation is performed. The authorization server A 110 performs authorizing when receiving the authorizing, or performs the authorizing cancellation when receiving the authorizing cancelation, and ends the process.

In step S613, the MFP 100 performs polling to make a request to obtain an access token to the authorization server A 110 via the network I/F 204.

In step S614, when generation of the access token has been completed for the request to obtain an access token from the MFP 100, the authorization server A 110 returns the access token to the MFP 100 via the network I/F 304. The MFP 100 causes the OAuth controller 509 to store the access token received via the network I/F 204 in the HDD 209.

In step S615, the MFP 100 notifies, via the network I/F 204, the client terminal 150 of the result of obtaining the access token. The client terminal 150 displays the result notification received from the MFP 100 via the network I/F 404 in a field for a token availability status 809 shown in FIG. 8 in the web browser 151. The token availability status 809 may be displayed by updating the setting screen provided by the MFP 100 with the token availability status 809 and reading out the updated setting screen with the web browser 151 of the client terminal 150. The readout of the setting screen may be performed by operating an update button in the web browser 151, or the updating may be automatically performed at a predetermined time interval.

The present invention is not limited thereto, and the token availability status in the setting screen may be updated in any manner. After the MFP 100 has obtained the access token, the display of the token availability status 809 in FIG. 8 is changed from "not obtained" to "in operation".

The settings in the case of using the email service of the company A are as described above.

Next, a case of using the email service of the company B is described with reference to FIGS. 10, 7, 11A, 11B, 12A to 12C, 13A and 13B.

FIG. 10 shows a sequence for the MFP 100 and the client terminal 150 to execute the OAuth2.0 authorization flow with respect to the authorization server B 130. The authorization flow is the authorization code flow out of the flows listed in the background art section.

Processing performed by the MFP 100 in FIG. 10 in the present embodiment is realized by the CPU 201 of the MFP 100 loading a program stored in the FlashROM 210 to the DRAM 202 and executing the loaded program. Processing performed by the MFP 100 in FIG. 10 is performed by the OAuth controller 509.

Processing performed by the authorization server B 130 in FIG. 10 is realized by the CPU 301 of the authorization server B 130 loading a program stored in the HDD 306 to the DRAM 302 and executing the loaded program.

Processing performed by the client terminal 150 in FIG. 10 is realized by the CPU 401 of the client terminal loading a program stored in the FlashROM 406 to the DRAM 402 and executing the loaded program.

The flow starts upon the client terminal 150 starting settings related to email transmission of the MFP 100.

In step S1001, the client terminal 150 connects to the MFP 100 from the web browser 151 via the network I/F 404. After the connection has been established, the client terminal 150 displays, in the web browser 151, the aforementioned setting screen related to email transmission of the MFP 100 shown in FIG. 7. When an item "OAuth 2.0 (company B) settings" 707 is selected in FIG. 7, a setting screen shown in FIG. 11A is displayed.

FIGS. 11A and 11B show examples of setting screens for executing the authorization code flow as the authorization flow, as mentioned above. The setting screen shown in FIG. 11A may be displayed by being transmitted from the MFP 100 to the client terminal 150 or by the web browser 151 the client terminal 150 from the MFP 100 reading out the setting screen.

In FIG. 11A, when the user inputs a client ID and a client secret that are registered in advance in the authorized server B 130 in a box of a client ID 1101 and a box of a client secret 1102, the input client ID and client secret are stored in the HDD 209 of the MFP 100. The storing is performed by operating a registration button provided, which is not shown in FIG. 11A.

In step S1002, when the user operates a "generate authorization server URL" button 1103 shown in FIG. 11A, a request to create an authorization server URL is transmitted from the client terminal 150 to the MFP 100 via the network I/F 404. The MFP 100 receives the request to create an authorization server URL from the client terminal via the network I/F 204.

In step S1003, the MFP 100 generates an authorization server URL based on the client ID and the client secret stored in the HDD 209.

In step S1004, the MFP 100 returns the authorization server URL to the client terminal 150 via the network I/F 204. The client terminal 150 displays the authorization server URL received from the MFP 100 via the network I/F 404 in an information for authorization field 1104 (FIGS. 11A and 11B) in the setting screen.

The information for authorization may be displayed by the MFP 100 updating the setting screen provided by the MFP 100 with the authorization server URL for the company B and transmitting the updated setting screen to the client terminal 150. Alternatively, the information for authorization may be displayed by the web browser 151 of the client terminal 150 reading out the updated setting screen. The readout may be performed by operating an update button in the web browser 151, or the updating may be automatically performed at a predetermined time interval. The present invention is not limited thereto, and the MFP 100 may cause the client terminal 150 to display the information for authorization in the setting screen in any manner.

In step S1005, when the user operates an "obtain authorization code" button 1105 shown in FIG. 11A displayed in the web browser 151 of the client terminal 150, the setting screen transitions to the screen shown in FIG. 11B. The screen transition may be displayed by the MFP 100 updating the setting screen provided by the MFP 100 and transmitting the updated setting screen to the client terminal 150, or may be displayed by the web browser 151 of the client terminal 150 reading out the updated screen. The readout may be performed by operating an update button in the web browser 151, or the updating may be automatically performed at a predetermined time interval.

The user inputs the authorization server URL for the company B displayed in the authorization server URL field 1104 in FIG. 11B to the web browser 151 of the client terminal 150. The client terminal 150 transmits an authorization request to the authorization server B 130 via the network I/F 404. The access to the authorization server may be performed by displaying the authorization server URL in the authorization server URL field 1104 as a link in FIG. 11B and transmitting the authorization request in response to the user operating the link.

When the authorization server B 130 receives the authorization request from the client terminal 150 via the network I/F 304, in step S1006, the authorization server B 130 returns an authorization screen to the client terminal 150 via the network I/F 304.

The web browser 151 of the client terminal 150 displays the authorization screen received from the authorization server B 130 via the network I/F 404. FIG. 12A shows an example of the authorization screen. The authorization screen shown in FIG. 12A is displayed in a window different from the setting screens shown in FIGS. 11A and 11B, but the present invention is not limited thereto.

In step S1007, the user inputs user information for accessing the authorized server B 130 in an input box for an account name 1201 and an input box for a password 1202 in the authorization screen shown in FIG. 12A. Thereafter, when the user operates a sign-in button 1203, the authorization information is transmitted to the authorization server B 130 via the network I/F 404.

In step S1008, if the authorization information received from the client terminal via the network I/F 304 is correct, the authorization server B 130 returns a confirmation screen to the client terminal 150 via the network I/F 304.

The web browser 151 of the client terminal 150 displays the confirmation screen received from the authorization server B 130 via the network I/F 404. FIG. 12B shows an example of the confirmation screen.

In step S1009, when the user operates a permit button 1205 in the confirmation screen shown in FIG. 12B, an authorization permission request is transmitted to the authorization server B 130 via the network I/F 404. On the other hand, when a cancel button 1204 is operated, a request to cancel the authorizing is transmitted to the authorization server B 130 via the network I/F 404.

In step S1010, if the authorization permission request is received from the client terminal 150 via the network I/F 304, the authorization server B 130 returns an authorization response including an authorization code to the client terminal 150 via the network I/F 304. On the other hand, when the cancel request is received, the authorization server B 130 performs processing to cancel the authorizing, and ends the processing.

The web browser 151 of the client terminal 150 displays, in an address bar in the web browser 151, the authorization response received from the authorization server B 130 via the network I/F 404. FIG. 12C shows an example of the authorization response screen.

In the authorization response screen shown in FIG. 12C, a portion denoted by 1206 in the URL displayed in the address bar in the Web browser 151 is an authorization code portion.

In step S1011, the user copies the authorization code 1206 portion in the authorization response displayed in the address bar shown in FIG. 12C in accordance with an instruction displayed in a field 1107 (FIG. 11B) in the web browser 151 of the client terminal 150. The user then pastes and sets the authorization code 1206 into the authorization code field 1108 shown in FIG. 11B. When the user operates an "obtain token" button 1110, the web browser 151 of the client terminal 150 transmits an instruction to obtain a token, together with the authorization code 1206 to the MFP 100 via the network I/F 404. On the other hand, if the user operates a cancel button 1109, the processing stops and ends. In the present embodiment, the input to the authorization code field 1108 is set by the user copying and pasting the display in the address bar. However, this need not necessarily be the case, and the input may alternatively be set by automatically extracting a character string from the address bar.

The MFP 100 receives the authorization code 1206 and the instruction to obtain a token, from the client terminal 150 via the network I/F 204.

In step S1012, the MFP 100 transmits a request to obtain an access token including the authorization code 1206 to the authorization server B 130 via the network I/F 204.

When the authorization server B 130 receives the request to obtain an access token from the MFP 100 via the network I/F 304, in step S1013, the authorization server B 130 generates an access token and returns the generated access token to the MFP 100 via the network I/F 304. The MFP 100 causes the OAuth controller 509 to store the access token received from the authorization server B 130 via the network I/F 204 in the HDD 209.

In step S1014, the MFP 100 notifies, via the network I/F 204, the client terminal 150 of the result of obtaining the access token.

The client terminal 150 displays the result notification received via the network I/F 404 in a token availability status field 1106 (FIG. 11A) in the web browser 151.

The result of obtaining the access token may be displayed by the MFP 100 updating the setting screen provided by the MFP 100 with the result of obtaining the access token and reading out the updated setting screen with the web browser 151 of the client terminal 150. The readout may be performed by operating an update button in the web browser 151, or the updating may be automatically performed at a predetermined time interval. The present invention is not limited thereto, and the MFP 100 may cause the client terminal 150 to display the result of obtaining the access token in the setting screen in any manner.

After the access token has been obtained, the display of the token availability status field 1106 is changed from "not obtained" to "in operation".

Figure 13B:
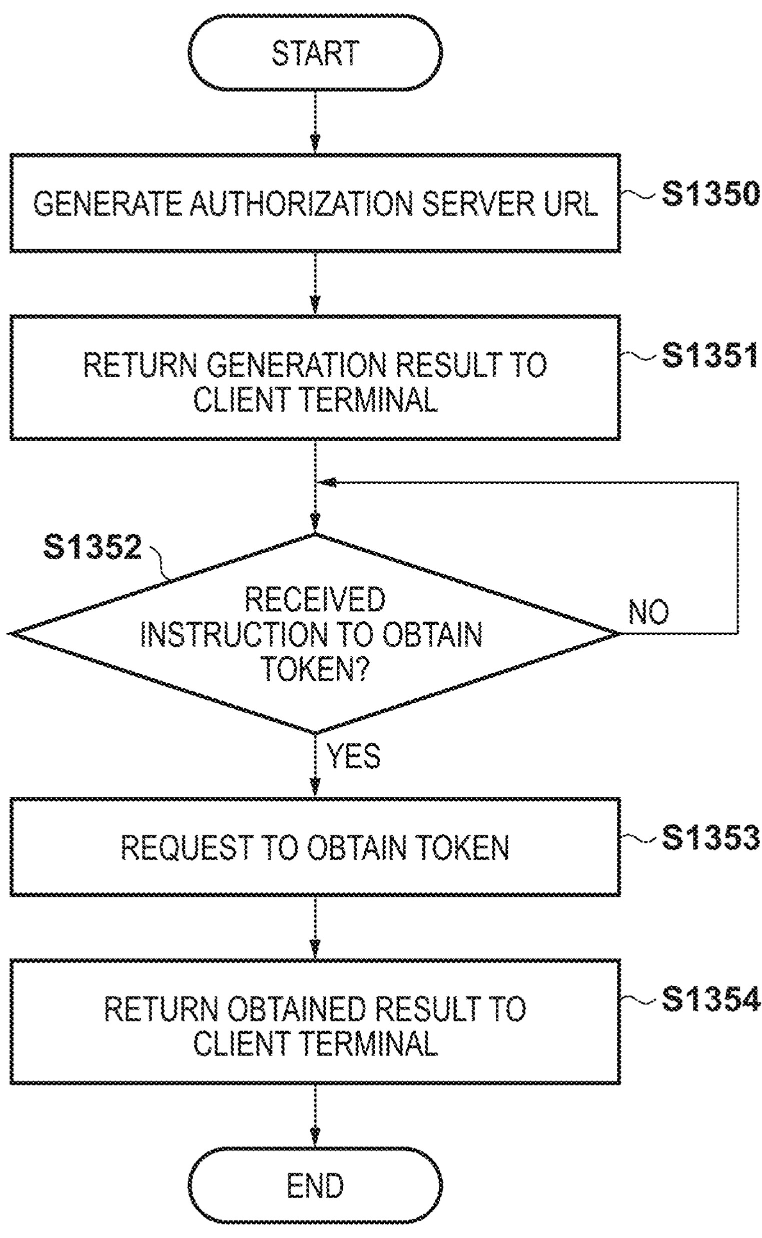
FIG. 13B is a flowchart in the authorization code flow.

FIGS. 13A and 13B are flowcharts based on the sequence diagram shown in FIG. 10. FIG. 13A is a flowchart of the client terminal 150, and FIG. 13B is a flowchart of the MFP 100.

Processing performed by the client terminal 150 in FIG. 13A is realized by the CPU 401 of the client terminal 150 loading a program stored in the FlashROM 406 to the DRAM 402 and executing the loaded program.

Processing performed by the MFP 100 in FIG. 13B is realized by the CPU 201 of the MFP 100 loading a program stored in the FlashROM 210 to the DRAM 202 and executing the loaded program. Processing performed by the MFP 100 in FIG. 13B is performed by the OAuth controller 509.

First, processing performed by the client terminal 150 is described with reference to FIG. 13A.

The flow starts upon the client terminal 150 starting settings related to email transmission of the MFP 100.

Processing for connecting to the MFP in step S1300 corresponds to step S1001, and processing for making a request to create an authorization server URL in step S1301 corresponds to step S1002.

In step S1302, the result for the request to create an authorization server URL made to the MFP 100 is received via the network I/F 404, and the result is determined. If the determination result is "successful", processing proceeds to step S1304, and if the determination result is "error", the processing proceeds to step S1303.

In step S1303, if the result of step S1302 is "error", an error message is displayed in the web browser 151, and the processing ends.

On the other hand, if the result of step S1302 is "successful" in step S1304, the authorization server URL is displayed in the authorization server URL field 1104 (FIGS. 11A and 11B) in the web browser 151 as in step S1004.

In step S1305, the processing is suspended until an authorization code is set in the authorization code field 1108 (FIG. 11B). Processing performed to obtain the authorization code is the above-described processing in steps S1005 to S1010 in FIG. 10.

Processing for giving the instruction to obtain a token in step S1306 corresponds to the processing in step S1011, and the request to obtain an access token is made to the MFP 100 via the network I/F 404.

Processing for displaying the result of obtaining the access token in step S1307 corresponds to the processing in step S1014. The client terminal 150 displays the result of obtaining the access token received via the network I/F 404 in the token availability status field 1106 (FIG. 11A) in the web browser 151.

Next, processing performed by the MFP 100 is described with reference to FIG. 13B.

Processing for generating an authorization server URL in step S1350 corresponds to step S1003.

Processing in step S1351 corresponds to the processing in step S1004, i.e., returning the result of successfully generating an authorization server URL to the client terminal 150 via the network I/F 204.

In step S1352, the processing is suspended until an instruction to obtain a token (S1306) is given from the client terminal 150.

If an instruction to obtain a token (S1306) is given from the client terminal 150 in step S1352, the processing proceeds to step S1353. Processing for making a request to obtain a token in step S1353 corresponds to the processing in step S1012, and processing for returning the result of obtaining an access token to the client terminal 150 in step S1354 corresponds to the processing in S1014.

Settings in the case of using the email service of the company B are as described above.

The present embodiment can provide setting screens for performing different types of authorizing for the email service A (first email service) for which authorizing is performed by means of the device flow and for the email service B (second email service) for which authorizing is performed by means of the authorization code flow.

Note that only the authorization code flow and the device flow out of the OAuth2.0 authorization flows defined in RFC listed in the background art section have been described in the present embodiment, but the present invention can also be applied to the other authorization flows.

According to the present embodiment, authentication using OAuth2.0 can be supported even by an MFP product in which a web browser cannot be installed due to the low hardware performance of the main body of the MFP.

Second Embodiment

A second embodiment of the present invention is described below.

In the present embodiment, an appropriate access token is selected from among a plurality of access tokens in accordance with email settings.

The present embodiment is described with reference to FIG. 14.

Figure 14:
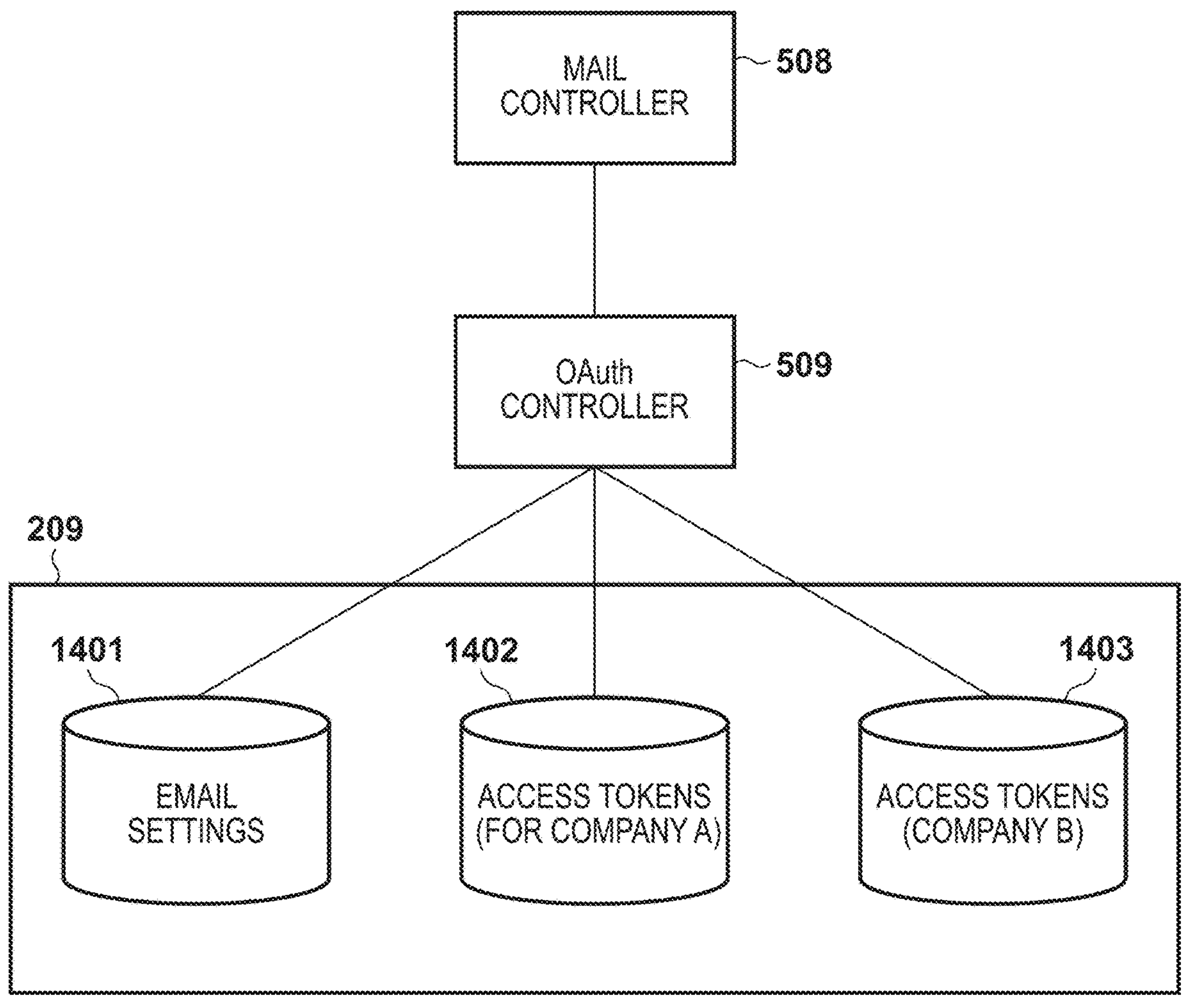
FIG. 14 illustrates an access token selection method.

Processing performed by the MFP 100 in FIG. 14 in the present embodiment is realized by the CPU 201 of the MFP 100 loading a program stored in the FlashROM 210 to the DRAM 202 and executing the loaded program. Processing of the present embodiment is performed by the email controller 508 and the OAuth controller 509 of the MFP 100.

The HDD 209 has storage areas for email settings 1401, access tokens (company A) 1402, and access tokens (company B) 1403.

Values of the email settings shown in FIG. 7 are stored in the email settings 1401. Access tokens obtained in step S615 in FIG. 6 are stored in the access tokens (company A) 1402. Access tokens obtained in step S1013 in FIG. 10 are stored in the access tokens (company B) 1403.

Email settings for only either the email server A 120 or the email server B 140 can be stored in the email settings 1401.

When transmitting and receiving an email using the OAuth2.0 authentication method, the email controller 508 obtains an access token via the OAuth controller 509.

The OAuth controller 509 obtains character strings set in the SMTP server setting field 702 and the POP server setting field 704 in the email settings 1401 when obtaining an access token. The OAuth controller 509 then determines based on the obtained character strings whether the settings in the email settings 1401 are for the email server A 120 or the email server B 140. The OAuth controller 509 switches between obtaining an access token out of the access tokens (company A) 1402 and the access tokens (company B) 1403 based on the determination result, and returns an appropriate access token to the email controller 508.

The present embodiment makes it possible to use an appropriate access token in accordance with the set values in the email settings when transmitting and receiving an email using the OAuth2.0 authentication method, even if there are a plurality of access tokens, and thus improves convenience for the user.

Modification 1

The email services that use the OAuth2.0 authentication method have been described in the first and second embodiments. It is obvious that the present invention can be applied to not only email services but also other cloud services that use the OAuth2.0 authentication method, such as cloud storage services.

Modification 2

In the first and second embodiments, the setting screens are displayed on the client terminal 150. However, if the MFP 100 has a web browser, the setting screens may alternatively be displayed on the main body of the MFP 100 to configure OAuth2.0 settings.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-150285, filed Sep. 15, 2023, which is hereby incorporated by reference herein in its entirety.

What is claimed is:

1. An image forming apparatus comprising:

a scanner for scanning an original document;

one or more memory devices that store a set of instructions; and one or more processors that execute the set of instructions to:

provide, to a web browser of an external terminal via a network, a first setting screen for performing authorizing settings of a first authorizing type for a first email service;

make a first request to the first email service using an access token obtained as a result of the authorizing settings of the first authorizing type, wherein the first request to the first email service is a request to send an email with image data attached, where the image data is generated by the scanner;

provide, to the web browser of the external terminal via the network, a second setting screen for performing authorizing settings of a second authorizing type, using a different access token issuance flow from the first authorizing type, for a second email service, and make a second request to the second email service using an access token obtained as a result of the authorizing settings of the second authorizing type, wherein the second request to the second email service is a request to send another email with image data attached, where the image data is generated by the scanner.

2. The image forming apparatus according to claim 1, further comprising a printer, wherein the printer prints image data generated by the scanner for copy processing.

3. The image forming apparatus according to claim 1, wherein the first setting screen or the second setting screen are provided based on a selection of a user.

4. The image forming apparatus according to claim 1, wherein the authorizing settings of first authorizing type are settings for authorizing by means of a device flow, and the first setting screen includes an object for giving the image forming apparatus an instruction to connect to an endpoint of an authorization server and make a request to authorize a device to the authorization server.

5. The image forming apparatus according to claim 4, wherein the first setting screen further displays a result of obtaining the access token from the authorization server as a token availability status.

6. The image forming apparatus according to claim 1, wherein the authorizing settings of the second authorizing type are settings for authorizing by means of an authorization code flow, and the second setting screen includes an object for giving the information processing apparatus an instruction to generate an authorization server URL based on a client ID and a client secret.

7. The image forming apparatus according to claim 6, wherein the second setting screen further includes an object for giving an instruction to obtain an authorization code from an authorization server based on the authorization server URL.

8. The image forming apparatus according to claim 7, wherein the second setting screen further includes an object for giving an instruction for causing the image forming apparatus to obtain the access token from the authorization server.

9. The image forming apparatus according to claim 8, wherein the authorization setting screen further displays a result of obtaining the access token from the authorization server as a token availability status.

10. A method for controlling an image forming apparatus, the method comprising:

providing, to a web browser of an external terminal via a network, a first setting screen for performing authorizing settings of a first authorizing type for a first email service;

making a first request to the first email service using an access token obtained as a result of the authorizing settings of the first authorizing type, wherein the first request to the first email service is a request to send an email with image data attached, where the image data is generated by the scanner;

providing, to the web browser of the external terminal via the network, a second setting screen for performing authorizing settings of a second authorizing type, using a different access token issuance flow from the first authorizing type, for a second email service; and making a second request to the second email service using an access token obtained as a result of the authorizing settings of the second authorizing type, wherein the second request to the second email service is a request to send another email with image data attached, where the image data is generated by the scanner.

11. A non-transitory computer readable storage medium on which is stored a computer program for causing a computer to execute a method for controlling an image forming apparatus, the method comprising:

providing, to a web browser of an external terminal via a network, a first setting screen for performing authorizing settings of a first authorizing type for a first email service;

making a first request to the first email service using an access token obtained as a result of the authorizing settings of the first authorizing type, wherein the first request to the first email service is a request to send an email with image data attached, where the image data is generated by the scanner;

providing, to the web browser of the external terminal via the network, a second setting screen for performing authorizing settings of a second authorizing type, using a different access token issuance flow from the first authorizing type, for a second email service; and making a second request to the second email service using an access token obtained as a result of the authorizing settings of the second authorizing type, wherein the second request to the second email service is a request to send another email with image data attached, where the image data is generated by the scanner.

* * * * *